United States Patent
Shaw et al.

(10) Patent No.: US 11,330,316 B2
(45) Date of Patent: May 10, 2022

(54) MEDIA STREAMING

(71) Applicant: Piksel, Inc., Wilmington, DE (US)

(72) Inventors: Philip Shaw, York (GB); Peter Heiland, Dover, MA (US); Ralf Tilmann, Mannheim (DE); Hans-Jurgen Maas, Mainz (DE); Sean Everett, New York, NY (US); Mark Christie, London (GB); Kristan Bullett, York (GB); Miles Weaver, York (GB); Fabrice Hamaide, Paris (FR)

(73) Assignee: PIKSEL, INC., Wilmington, DE (US)

( * ) Notice: Subject to any disclaimer, the term of this patent is extended or adjusted under 35 U.S.C. 154(b) by 19 days.

(21) Appl. No.: 15/736,891

(22) PCT Filed: Jun. 15, 2016

(86) PCT No.: PCT/EP2016/063806
§ 371 (c)(1),
(2) Date: Dec. 15, 2017

(87) PCT Pub. No.: WO2016/202890
PCT Pub. Date: Dec. 22, 2016

(65) Prior Publication Data
US 2019/0110096 A1    Apr. 11, 2019

Related U.S. Application Data

(60) Provisional application No. 62/175,878, filed on Jun. 15, 2015.

(51) Int. Cl.
*H04N 7/173* (2011.01)
*H04N 21/262* (2011.01)
(Continued)

(52) U.S. Cl.
CPC ...... *H04N 21/26233* (2013.01); *H04H 60/46* (2013.01); *H04L 65/607* (2013.01);
(Continued)

(58) Field of Classification Search
CPC .......... H04N 21/4788; H04N 21/2143; H04N 21/42203; H04N 21/44222; H04N 21/26233; H04N 21/8549
(Continued)

(56) References Cited

U.S. PATENT DOCUMENTS 9,747,946 B2 * 8/2017 Groman ............. H04N 21/2541
9,865,308 B2 * 1/2018 Gower ............... H04N 21/8549
(Continued)

FOREIGN PATENT DOCUMENTS

WO    2007117613 A2    10/2007

OTHER PUBLICATIONS

Wen Gao, et al., "Vlogging: A Survey of Videoblogging Technology on the Web", ACM Comput. Surv. 42, ACM, NY, NY, Jun. 23, 2010.
(Continued)

*Primary Examiner* — Jivka A Rabovianski
(74) *Attorney, Agent, or Firm* — Holzer Patel Drennan

(57) ABSTRACT

There is disclosed a system for providing streaming services, comprising: a plurality of capture devices, each for capturing data and providing a captured data stream; and a server, for receiving the plurality of captured data streams; wherein each capture device is configured to generate metadata for the captured data, and transmit said metadata to the server.

20 Claims, 22 Drawing Sheets

(51) Int. Cl.

| | | |
|---|---|---|
| H04N 21/231 | (2011.01) | |
| H04N 21/232 | (2011.01) | |
| H04N 21/235 | (2011.01) | |
| H04N 21/24 | (2011.01) | |
| H04N 21/242 | (2011.01) | |
| H04N 21/2665 | (2011.01) | |
| H04N 21/2668 | (2011.01) | |
| H04N 21/4223 | (2011.01) | |
| H04N 21/43 | (2011.01) | |
| H04N 21/4402 | (2011.01) | |
| H04N 21/442 | (2011.01) | |
| H04N 21/482 | (2011.01) | |
| H04N 21/6332 | (2011.01) | |
| H04N 21/84 | (2011.01) | |
| H04N 21/8547 | (2011.01) | |
| H04N 21/433 | (2011.01) | |
| H04N 21/443 | (2011.01) | |
| H04N 21/81 | (2011.01) | |
| H04N 21/2343 | (2011.01) | |
| H04N 21/8358 | (2011.01) | |
| H04N 21/414 | (2011.01) | |
| H04N 21/218 | (2011.01) | |
| H04N 21/2187 | (2011.01) | |
| H04N 21/633 | (2011.01) | |
| H04H 60/46 | (2008.01) | |
| H04N 21/234 | (2011.01) | |
| H04L 65/60 | (2022.01) | |
| H04N 21/254 | (2011.01) | |
| H04N 21/266 | (2011.01) | |
| H04N 21/258 | (2011.01) | |

(52) U.S. Cl.
CPC ... *H04N 21/2187* (2013.01); *H04N 21/21805* (2013.01); *H04N 21/232* (2013.01); *H04N 21/235* (2013.01); *H04N 21/2343* (2013.01); *H04N 21/2353* (2013.01); *H04N 21/2358* (2013.01); *H04N 21/23106* (2013.01); *H04N 21/23418* (2013.01); *H04N 21/23439* (2013.01); *H04N 21/234336* (2013.01); *H04N 21/2402* (2013.01); *H04N 21/242* (2013.01); *H04N 21/2407* (2013.01); *H04N 21/2541* (2013.01); *H04N 21/25866* (2013.01); *H04N 21/2665* (2013.01); *H04N 21/2668* (2013.01); *H04N 21/26208* (2013.01); *H04N 21/26613* (2013.01); *H04N 21/414* (2013.01); *H04N 21/41407* (2013.01); *H04N 21/4223* (2013.01); *H04N 21/433* (2013.01); *H04N 21/4305* (2013.01); *H04N 21/4307* (2013.01); *H04N 21/4331* (2013.01); *H04N 21/4334* (2013.01); *H04N 21/44029* (2013.01); *H04N 21/4431* (2013.01); *H04N 21/44204* (2013.01); *H04N 21/440236* (2013.01); *H04N 21/440263* (2013.01); *H04N 21/4828* (2013.01); *H04N 21/633* (2013.01); *H04N 21/6332* (2013.01); *H04N 21/8186* (2013.01); *H04N 21/8358* (2013.01); *H04N 21/84* (2013.01); *H04N 21/8547* (2013.01)

(58) Field of Classification Search
USPC .............................. 725/116, 25, 47, 110, 133
See application file for complete search history.

(56) References Cited

U.S. PATENT DOCUMENTS

| | | | |
|---|---|---|---|
| 2009/0148124 A1 | 6/2009 | Athsani | |
| 2011/0069179 A1* | 3/2011 | Bathiche | ............ H04N 5/23206 |
| | | | 348/207.1 |
| 2011/0096828 A1* | 4/2011 | Chen | ................... H04N 21/435 |
| | | | 375/240.02 |
| 2011/0145726 A1* | 6/2011 | Wei | ...................... H04N 21/252 |
| | | | 715/752 |
| 2012/0192242 A1 | 7/2012 | Kellerer et al. | |
| 2012/0265621 A1 | 10/2012 | Sechrist et al. | |
| 2013/0339539 A1 | 12/2013 | Scherlis | |
| 2014/0085485 A1 | 3/2014 | Gavita et al. | |
| 2014/0281011 A1 | 9/2014 | Zarom | |
| 2015/0043892 A1 | 2/2015 | Groman | |
| 2015/0120839 A1 | 4/2015 | Kanna et al. | |
| 2017/0289620 A1* | 10/2017 | Wells | ............... H04N 21/44222 |

OTHER PUBLICATIONS

International Search Report and Written Opinion for Application PCT/EP2016/063806, issued by the European Patent Office, dated Sep. 26, 2016.

Pereira F. et al., "Multimedia Retrieval and Delivery: Essential Metadata Challenges and Standards", Proceedings of the IEEE, New York, vol. 96, No. 4, Apr. 1, 2008.

Tag, Benjamin, et al., "Collaborative Storyboarding Through Democratization of Content Production", Advances in Computer Entertainment Technology, ACM, New York, Nov. 11, 2014.

Hesselman, Cristian, et al., "Sharing Enriched Multimedia Experiences Acoss Heterogeneous Network Infrastructures", IEEE Communications Magazine, vol. 48, No. 6, Jun. 1, 2010.

Murray, Kevin, et al., "TM-CSS0017r7:TM-SM-CSS-0017 Companion Screens and Supplementary Streams Report", Digital Video Broadcasting, (DVB), Geneva Switzerland, Feb. 18, 2013.

Examination report for European Application 16729572.4, dated Mar. 1, 2019.

* cited by examiner

Accept = User agrees for content to be used
Reject = User does not agree, stream ends, recordings (if any) are dropped

- Watermarks added throughout the content, one after the other
- Each watermark comprises the WID for the stream + timecode as measured at the start of each watermark Rights Holder's Protected Event
Event ID
+ List of WID [(start,end)] — Optionally includes start/end times in the identified stream

MEDIA STREAMING

BACKGROUND TO THE INVENTION

Field of the Invention

The present invention relates to the provision and/or the use of metadata in conjunction with associated content.

Description of the Related Art

It is known to provide data (which may also be referred to as content data) and metadata. The metadata is data describing or defining attributes of the data.

In a system in which a central server provides services for data received from multiple sources, it is typically required that the metadata for the data is generated at the server. This potentially requires the server to perform processing for multiple sources of data and is processor intensive for the server.

It is a first aim to reduce the processing required to be carried out in such a scenario by a centralised server.

It is known to provide content streamed from devices which capture data to other device which consume or view data.

A system in which a central server receives data streamed from many devices and makes multiple streams available for consumption by other devices is an example of a scenario where the identification and viewing of relevant content for the other device can be difficult.

In such an example system in which a central server provides captured content to be viewed, if a large volume of captured content is provided it may be difficult to usefully present this, for example for viewing.

It is a second aim to usefully present content.

In an example system in which a central server provides captured content to be viewed, it may be difficult to distinguish between content—even if it meets particular criteria—particularly if the objective is to provide a live feed. This is particularly so if the live feed is to be edited or moderated.

It is a third aim of the invention to usefully order content.

Further, in such an example system, where the central server receives multiple data streams it can be difficult for any editing or moderation of the content of received streams to be applied, in order for these streams to then be viewed live by other devices.

It is desirable to allow for moderation or editing of captured data streams to allow them to be viewed efficiently as live streams.

SUMMARY OF THE INVENTION

An example implementation of a system with a central server concerns the capture of images and the generation of associated video streams in a video streaming environment comprising a plurality of capture devices (such as mobile phones) connected to a streaming server via one or more networks such as the Internet. In dependence on the received captured video streams the streaming server may generate one or more further video streams for viewing by one or more viewing devices.

In a first aspect there is provided a system for providing streaming services, comprising: a plurality of capture devices, each for capturing data and providing a captured data stream; and a server, for receiving the plurality of captured data streams; wherein each capture device is configured to generate metadata for the captured data, and transmit said metadata to the server.

The metadata may be transmitted to the server in the captured data stream.

The metadata may be transmitted to the server on one or more metadata streams additional to the captured data stream.

The metadata may be synchronised with the associated captured data for transmission from the capture device.

The metadata and the captured data may be associated with a common time line, wherein the server determines the time line and synchronises the captured data and the metadata based on the time line. The server may determine the timeline from the captured data stream. The server may determine the time line from the one or more metadata streams.

The capture devices may communicate with a further device or server in order to obtain additional data for the captured data stream. The capture device may communicate with a further device or server to transcribe the captured data stream. The further device or server may provide a geolocation for the capture device.

The system may further comprise a viewing device, the server outputting a viewing stream to the viewing device. One or more captured data streams may be routed to the viewing device in dependence on the metadata associated with the captured data streams. The viewing device may be associated with a moderator of content or an editor of content.

In this aspect there may be provided corresponding methods and processes.

Video streams may be grouped which have a common location or a common time or matching or overlapping time lines. The location and time may be provided as meta-data at the capture device. Other tags can be added as meta-data, e.g. tags identifying somebody that has requested to be filmed so any stream identifying them can be grouped.

The existing video stream may be augmented or one or more additional augmented video streams may be created. The augmented video stream, or the video stream and the one or more augmented video streams may be transmitted to the server. Where a video stream is augmented, and an additional augmented video stream is created, the metadata associated with the video stream is also modified, to reflect the augmentation.

The augmentation of the video stream may be achieved by transmitting the video stream to a processing server which processes the video stream. The processing may comprise speech-to-text conversion, and may comprise providing the video stream to a speech-to-text recognition module. After such processing, the processing server transmits the results of its processing back to the capture device. An augmented video stream is then available from the capture device, and the metadata for the video stream is suitably modified to reflect the speech-to-text conversion.

The metadata derived from the stream is sent back to the capture device.

The processing may comprise providing video or audio of the video stream to a cloud-based speech-to-text recognition service.

An augmented video stream may be a video stream with subtitles.

The metadata that is generated for the augmented video stream may be transmitted from the capture device to the streaming server together with the original video stream. The metadata may be provided in a metadata stream separate to the video stream.

The method may comprise providing the data stream and/or the augmented video stream based on the metadata to one or more viewing devices. The video stream and the augmented video stream may be provided to different viewing devices.

The augmented video stream may comprise the video stream with additional data. The additional data may be meta-data. The meta-data may be used for grouping the video stream. The meta-data may be used for recommendations/ invitations/searching/searching within content.

The creation of metadata associated with the additional or augmented content helps improve the discoverability of the content at a server.

In a second aspect there is provided a system for providing streaming services, comprising: a plurality of capture devices, each for capturing data and providing a captured data stream; and a server, for receiving the plurality of captured data streams and outputting at least one output stream, wherein the server is configured to dynamically group the captured data streams in dependence on metadata associated with the captured data streams.

The metadata for a captured data stream may be received from the associated capture device.

The metadata for a captured data stream may be determined at the server. The server may be configured to dynamically group the streams in dependence on a current definition of a group. The server may be configured to dynamically group the streams in dependence on the current metadata of the data streams. The captured data streams allocated to a group may be output to an editing device. The editing device may control the output data stream from the server for the group.

The captured data streams may be prioritised in dependence on the metadata associated with the captured data streams of the group. The captured data streams within each group may be prioritised.

Control data to be applied to a captured data stream may be provided from an external source. The control data may comprise a set of rules. The set of rules may define a group. The set of rules may be used to allocate data to a group.

In this aspect there may be provided corresponding methods and processes.

The identification of the groups may be dynamic. This dynamic nature of the groups may be manifested in two ways. Firstly, data streams may be allocated to groups on a dynamic basis in dependence on a current definition of a group. If a definition of a group change, then the allocation of current data streams to that group may change. The definition of a group may change as rules defining a group may change. Secondly, the allocation of a data stream to a group may dynamically change. This may be because the metadata associated with the data stream indicates that the data stream should no longer be allocated to a particular group, for example.

The dynamic behaviour may or may not be applicable to all the aspects and embodiments herein.

In this aspect there may be provided a method comprising: receiving a plurality of video streams from a plurality of capture devices; and grouping two or more video streams. The grouping of video streams may be dependent upon meta-data associated with a video stream. The video streams may be received from a plurality of independent capture devices.

The method may comprise identifying a location associated with the capture device providing the received video stream based on the location provided in the metadata, and grouping video streams according to location. The method may comprise identifying a time associated with the video stream, and grouping video streams associated with a predetermined time. The method may comprise identifying a direction-of-view of a capture device providing a video stream, and grouping video streams in dependence on the point of view.

The method may comprise grouping video streams in dependence on common characteristics of video streams, which may be the metadata of the streams. The method may comprise receiving one or more characteristic, and grouping video streams associated with that characteristic. The characteristic may be received from a user. The characteristic may be received from a user of a capture device. The characteristic may be received from a user associated with a device which is being used to view a video stream. The characteristics may be received from the respective devices, i.e. an automated process without any active input from the users.

Grouped video streams may be provided to viewing devices associated with the group.

Where the method involves capturing the direction of view, there may be associated a compass bearing. The compass bearing may be a compass bearing captured from a compass application or function of the capture device. A direction of view throughout the stream may be recorded as time live metadata which is associated with the stream. In this way, the direction of view at any moment can be identified.

The method may involve identifying a user who has requested that he be filmed so that any stream identifying him is grouped.

Video streams may be grouped which have a common location or a common time or matching time.

In general, grouping identifies a cluster of streams so they can be grouped and readily noticed. The streams can be grouped in dependence on the content and/or the meta-data associated with them.

There may be provided an adaptation in which previous clusters are associated with geo-locations so that events can more easily be spotted in group streams.

The method may comprise grouping two or more video streams in dependence on determined metadata. The video streams grouped in dependence on metadata may be addressed to viewing devices which have identified the associated metadata in a configuration step. The metadata may define a tag, description, location, or event.

Watermarking may be utilised with grouping. A record may be kept of watermarks belonging to streams which have been allocated to particular groups. This allows a future stream (or clip of a stream) to be checked to see if it was previously allocated to a group. The watermark is not a determining factor in how a stream is allocated to a group. It is a method to check if a stream was allocated to a group and if so, which group.

There may thus be provided a method of: receiving a portion (or clip) of a video stream from a capture device; determining a video watermark in the portion of the video stream; and determining if the portion of the video stream is associated with a video stream previously allocated to a group in dependence on the determined watermark for that stream. This aspect may be referred to as video watermarking.

The filtering may accept or reject a video stream in dependence on the determined video watermark.

In dependence on a determined video watermark, a video stream may be routed for further processing. The further processing may be associated with a content rights holder. A determined video watermark may identify an association with a rights holder.

A video stream may be identified as being associated with a captured device in dependence on the presence of the video watermark.

The method may be implemented in a server which may be adapted to receive captured data streams from registered capture devices, such that a video stream provided by the server for viewing is an authorised video stream. The streaming server preferably selects a number of streams which it provides to the viewing device. Any video stream viewed and including the video-watermark may be recognised as having been generated by a particular server.

In a third aspect there is provided a system for providing streaming services, comprising: a plurality of capture devices, each for capturing data and providing a captured data stream; and a server, for receiving the plurality of captured data streams and outputting at least one output stream, wherein the server is configured to dynamically prioritise the captured data streams in dependence on metadata associated with the captured data streams.

The server may be configured to dynamically prioritise the streams in dependence on a current definition for prioritisation.

The server may be configured to dynamically prioritise a data stream in dependence on the current metadata of that data stream.

The captured data streams may be grouped, and then within each group the data streams are prioritised in dependence on the metadata associated with the captured data streams.

The priority of a captured data stream may be used to determine the output of that captured data stream from the server.

The metadata for a captured data stream may additionally include a prioritisation score. The prioritisation score for a captured data stream may be dynamic. The prioritisation score may be based on a reputation of a user associated with the capture device. The metadata for a captured data stream may additionally include feedback data from a device receiving the output stream from the server.

The device having made a request for content from the server, the prioritisation score may be indicative of the relevance of the captured data stream to that request.

The feedback may be used to adjust a prioritisation score of the captured device data stream. The prioritisation score may be a viewer rating.

The metadata for a captured data stream may additionally include feedforward data based on the capture device from which the captured data stream is provided. The feedforward data may be used to adjust a prioritisation score of the captured data stream. The prioritisation score may be a capture device rating.

The captured data streams may be edited in dependence on their priority.

The server may edit captured data stream based on a set of rules. The set of rules may apply to a group.

The set of rules may be used to allocate a data stream to a group in dependence on the metadata of the data stream.

The server may additionally edit captured data streams in dependence on a received control signal.

The metadata for a captured data stream may be received from the associated capture device. The metadata for a captured data stream may be determined at the server.

The server may edit the captured data stream by applying an overlay to the captured data stream.

The server may group the captured data streams in dependence on the metadata associated with the captured data streams. The server may edit the captured data stream by applying an overlay to all captured data streams allocated to a given group. The applied overlay may indicate a branding. The applied overlay may indicate a rights assignment of the content of the captured data stream.

In this aspect there may be provided corresponding methods and processes.

Any method or process may be implemented in software. Any method or process may be provided as a computer software code which, when executed on a computer, performs the associated method or process.

This aspect provides, in an example, a method comprising: receiving a plurality of captured video streams from a plurality of capture devices; extracting metadata associated with the received video streams; analysing the extracted metadata; and applying a priority to each captured data stream in dependence on the analysis of the metadata.

The identification of the priorities may be dynamic. This dynamic nature of the prioritisation may be manifested in two ways. Firstly, data streams may be allocated to priorities on a dynamic basis in dependence on a current definition of a priority. If a definition of a priority changes, then the allocation of current data streams to that priority may change. The definition of a priority may change as rules defining a priority may change. Secondly, the allocation of a data stream to a priority may dynamically change. This may be because the metadata associated with the data stream indicates that the data stream should no longer be allocated to a particular priority, for example.

The allocation of priority to streams may be used to provide an ordered list of streams, with those of the highest priority at the top of that ordered list and those of the lowest priority at the bottom of that ordered list. The ordered list may then be used for further processing of the streams, with the highest priority streams being processed first. If only a certain number of streams can be processed, then the highest priority streams are processed.

The method may further comprise a step of moderating the video streams in dependence on the prioritising step. The method may further comprise a step of recommending the video streams in dependence on the prioritising step. Rules for moderating or recommending may be set by an event manager. The highest priority streams may be moderated or recommended first, and streams generally processed in accordance with the ordered list.

Where the method comprises a step of moderating, the moderating may comprise an automated step. All streams may be applied to an auto moderator. Some streams may be allowed through because they comply with rules which have been set for the event. Other streams which do not comply with the rules may not be allowed through, or may be forwarded to a manual moderator. The prioritising is used to prioritise the streams (which may be a group of streams) for delivery to the moderator.

The method may include identifying the source of the video stream. The method may include the reputation of the source as a criterion. The method may include the reputation of the source in a particular category—e.g. person A has a good reputation for filming outdoor content, but a poor reputation for filing indoor content. If the content person A is currently providing is indoor, then their reputation as measured by this tag is used.

The method includes identifying the quality of the video stream, and including the quality of the source as a criterion.

The method includes identifying the compatibility of the video stream with a search criterion, and including the compatibility as a criterion. A search criterion may be provided by a viewing device. The compatibility with the search criterion may be used to assign a priority to a stream.

The priority may be used in one or all steps of: moderating the content; reviewing the content; recommending the content; or selecting the content.

All parts of grouping and all parts of prioritisation may be implemented separately or in combination, with any individual art of grouping being combined with any individual part of prioritisation.

The second and third aspects relating to grouping and prioritisation may also provide a method comprising: receiving at least one captured video stream from a capture device; editing the video stream; and providing the edited video stream. This editing may also be considered as filtering streams.

Editing the video stream may comprise overlaying content to the video stream. The overlaid content may comprise adding a link or content to the video stream.

The editing may comprise recognising an image in the capture video stream, and editing the captured video stream to remove that image. This step may be performed at a video streaming sever.

There may be provided pre-recorded content, the editing comprising combining the captured video stream and the pre-recorded content. This step may be performed at a video streaming sever.

The editing may comprise manipulation of the captured data stream.

There may be provided interactive content, the editing comprising combining the captured video stream and the interactive content, without altering the video data. The interactive content may be a donation link.

The editing may comprise manipulation of the captured data stream to include interactive content. The interactive content may be a donation link.

The term editing refers to manipulation of the video stream. The term does not refer to altering the actual content, i.e. the video data, within the video stream, but to in some way adjusting the video stream presented. Where overlays are applied, they are not applied like special effects. Rather the viewing devices receives the unaltered video together with a set of time coded instructions that described the overlay content. These instructions may be added as metadata to the stream, but may also be provided as a separate resource. Thus the term 'edit' is used in a general sense.

The method may further comprise identifying a plurality of video streams as being associated with each other; retrieving a token from one of the video streams, and editing the video stream by providing only the video stream having the token. The method may comprise receiving a request for the token from a capture device, and transmitting the token to the capture device. The method may comprise sorting the identity of the capture device to which the token has been transmitted. A plurality of video streams are thus filtered in dependence on a token.

The method may comprise establishing a session for the provision of the stream, wherein the session is associated with a predetermined time, wherein the step of editing comprises terminating the session when the predetermined time elapses. The method may further comprise inhibiting the establishment of a further session with that capture device or a user associated with that capture device for a further predetermined time period once that predetermined time period expires. The step of inhibiting may be dependent on the capture location being located in a geolocation associated with the first session.

The method may comprise identifying the presence of a rectangle in a video stream, and processing the video stream to determine if the video stream comprises protected content, wherein the step of editing comprises inhibiting streams comprising protected content. The method may comprise identifying a deformed rectangle and processing the image to provide a rectified rectangle.

BRIEF DESCRIPTION OF THE FIGURES

The invention will now be described by way of reference to the accompanying drawings, in which.

DESCRIPTION OF PREFERRED EMBODIMENTS

Figure 1:
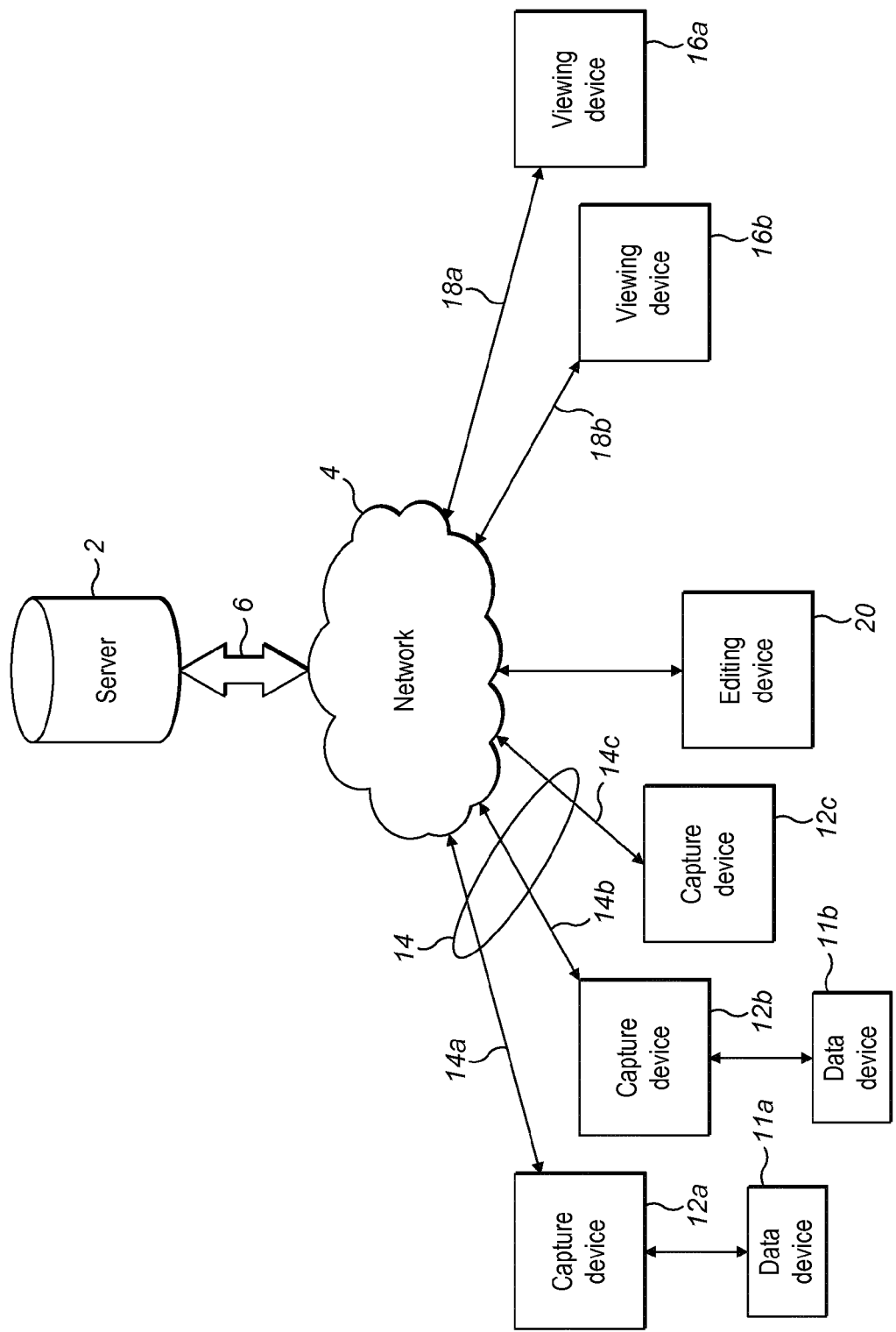
FIG. 1 illustrates an exemplary architecture in which described examples may be implemented.

With reference to FIG. 1 there is illustrated a system architecture within which embodiments of the invention may be implemented.

With reference to FIG. 1 there is illustrated: a plurality of devices, labelled capture devices, denoted by reference numerals 12a, 12b, 12c; a plurality of devices, labelled viewing devices, denoted by reference numerals 16a, 16b; a device, labelled editing device, denoted by reference numeral 20a; a network denoted by reference numeral 4; and a server denoted by reference numeral 2.

Each of the devices 12a, 12b, 12c is referred to as a capture device as in the described embodiments of the invention the devices capture content. However the devices are not limited to capturing content, and may have other functionality and purposes. In examples each capture device 12a, 12b 12c may be a mobile device such as a mobile phone.

Each of the capture devices 12a, 12b, 12c may capture an image utilising a preferably integrated image capture device (such as a video camera), and may thus generate a video stream on a respective communication line 14a, 14b, 14c.

The respective communication lines 14a, 14b, 14c provide inputs to the network 4, which is preferably a public network such as the Internet. The communication lines 14a, 14b, 14c are illustrated as bi-directional, to show that the capture devices 12a, 12b, 12c may receive signals as well as generate signals.

The server 2 is configured to receive inputs from the capture devices 12a, 12b, 12c as denoted by the bi-directional communication lines 6, connected between the server 2 and the network 4. In embodiments, the server 2 receives a plurality of video streams from the capture devices, as the signals on lines 14a, 14b, 14c are video streams.

The server 2 may process the video streams received from the capture devices as will be discussed further hereinbelow.

The server 2 may generate further video streams on bi-directional communication line 6 to the network 4, to the bi-directional communication lines 18a, 18b, associated with the devices 16a, 16b respectively.

Each of the devices 16a, 16b is referred to as a viewing device as in the described embodiments of the invention the devices allow content to be viewed. However the devices are not limited to providing viewing of content, and may have other functionality and purposes. In examples each viewing device 16a, 16b may be a mobile device such as a mobile phone.

The viewing devices 16a and 16b may be associated with a display (preferably an integrated display) for viewing the video streams provided on the respective communication lines 18a, 18b.

A single device may be both a capture device and a viewing device. Thus, for example, a mobile phone device may be enabled in order to operate as both a capture device and a viewing device.

A device operating as a capture device may generate multiple video streams, such that a capture device such as capture device 12a may be connected to the network 4 via multiple video streams, with multiple video streams being provided on communication line 14a.

A viewing device may be arranged in order to receive multiple video streams. Thus a viewing device such as viewing device 16a may be arranged to receive multiple video streams on communication line 18a.

A single device may be a capture device providing multiple video streams and may be a viewing device receiving multiple video streams.

Each capture device and viewing device is connected to the network 4 with a bi-directional communication link, and thus one or all of the viewing devices 16A, 16B may provide a signal to the network 6 in order to provide a feedback or control signal to the server 2. The server 2 may provide control signals to the network 4 in order to provide control signals to one or more of the capture devices 12a, 12b, 12c.

The capture devices 12a, 12b, 12c are preferably independent of each other, and are independent of the server 2. Similarly the viewing devices 16a, 16b are preferably independent of each other, and are independent of the server 2.

The capture devices 12a, 12b, 12b are shown in FIG. 1 as communicating with the server 2 via a single network 4. In practice the capture devices 12a, 12b, 12c may be connected to the server 2 via multiple networks, and there may not be a common network path for the multiple capture devices to the server 2. Similarly the viewing devices 16a, 16b may be connected to the server 2 via multiple networks, and there may not be a single common network path from the server 2 to the viewing devices 16a, 16b.

Also shown in FIG. 1 is the editing device 20, connected to the network 4 by bi-directional communication link 22.

The editing device, which may additionally function as a capture device and/or a viewing device, may be used to provide additional control information to the server 2.

FIG. 1 further illustrates two metadata service blocks 11a and 11b, each respectively connected to the capture devices 12a and 12b via bi-directional communication links. The operation of these blocks will be described further hereinbelow.

Generating Metadata

Capture devices such as devices 12a, 12b, 12c typically are used by a user (who may also be referred to as a contributor) to capture an event. For example a capture device may be equipped with a video camera, and the contributor may use the capture device to video content. The thus captured video content is transmitted from the capture device to the network as a capture stream. A mobile phone is an example of a capture device.

In addition to providing the capture stream comprising the captured data, it is known to provide metadata for data content. Typically the metadata is generated when a content stream is received. Thus typically a service operating on the server 2 may generate metadata for a data content stream which is received from one of the capture devices.

In a described example, the capture devices 12a, 12b, 12c are configured in order to generate the metadata for captured data, and then transmit this metadata to the content service running on the server 2 in addition to the data content itself. Advantageously this means that the content service running on the server 2 does not have to generate the metadata itself, and thus processing resources for doing so do not need to be provided.

Figure 2:
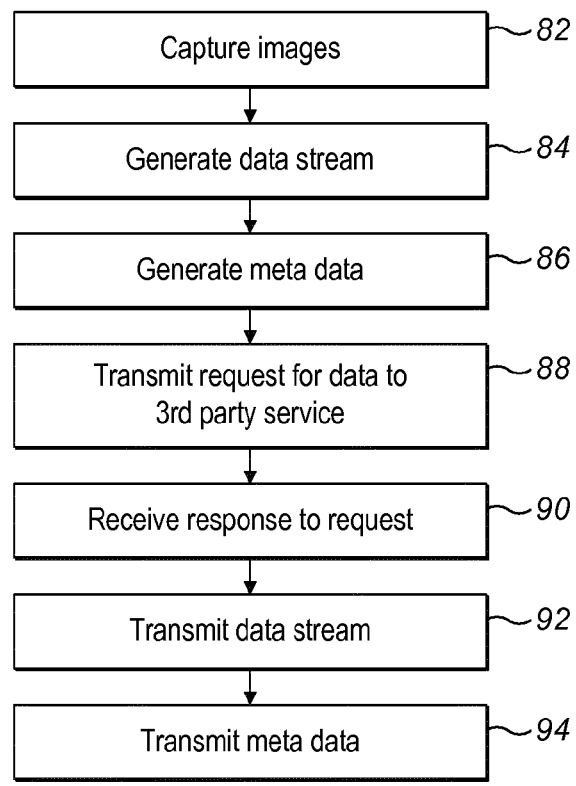
FIG. 2 illustrates an exemplary process for generating metadata.

With reference to FIG. 2, an exemplary process is described.

As denoted by step 82, a capture device (such as capture device 12a) captures images. This for example may be a video device associated with the capture device 12a capturing video images of an event taking place in the location of the contributor associated with the capture device 12a.

In a step 84 a data stream is generated for transmission on communication line 14a from capture device 12a, so that the data stream is delivered to the server 2 via the network 4. In examples the data stream may be utilised to provide a live data stream of the event being videoed, and therefore the captured data stream is transmitted as a live representation of the event.

As denoted by step 86, the capture device 12a generates metadata for the captured data stream. The metadata generated will be implementation dependent. For example the metadata generated for the data content may include a tag identifying the location of the capture device, a tag identifying the identity of the capture device, a tag identifying the identity of the contributor etc. In addition, the metadata may include time information, such as a start time associated with the data capture, and/or a time of day. The metadata may also include the termination time of the captured data, or the duration time of the captured data. The capture device 12a may also be configured to allow the contributor to provide additional information to be tagged as metadata using a user interface of the capture device 12a. However metadata may be created and generated automatically.

As denoted by step 88 of FIG. 2, the capture device such as capture device 12a may also transmit a request for data to a third party service, hosted on a separate device. As illustrated in FIG. 1, capture device 12a may communicate with a data service 11a, and capture device 12b may communicate with a data service 11b. The capture devices can communicate with such third party services and obtain additional data, and then associated metadata for the content is created by the capture device.

In one example, a third party service provided by data service such as 11a or 11b may provide a transcription service. Voice recognition functionality may be provided by the service, in order to determine either what the voice content of the capture data is, or to determine the voice content of the contributor. For example, a voice signal of the contributor may be provided separately to the data service, and may be transcribed in order to provide additional data content for captured data. The addition (or augmentation) to metadata due to such additional content provided by such a service helps improve the discoverability of the data content when it is provided as a large pool of content at the server 2.

Augmented Data

Figure 3:
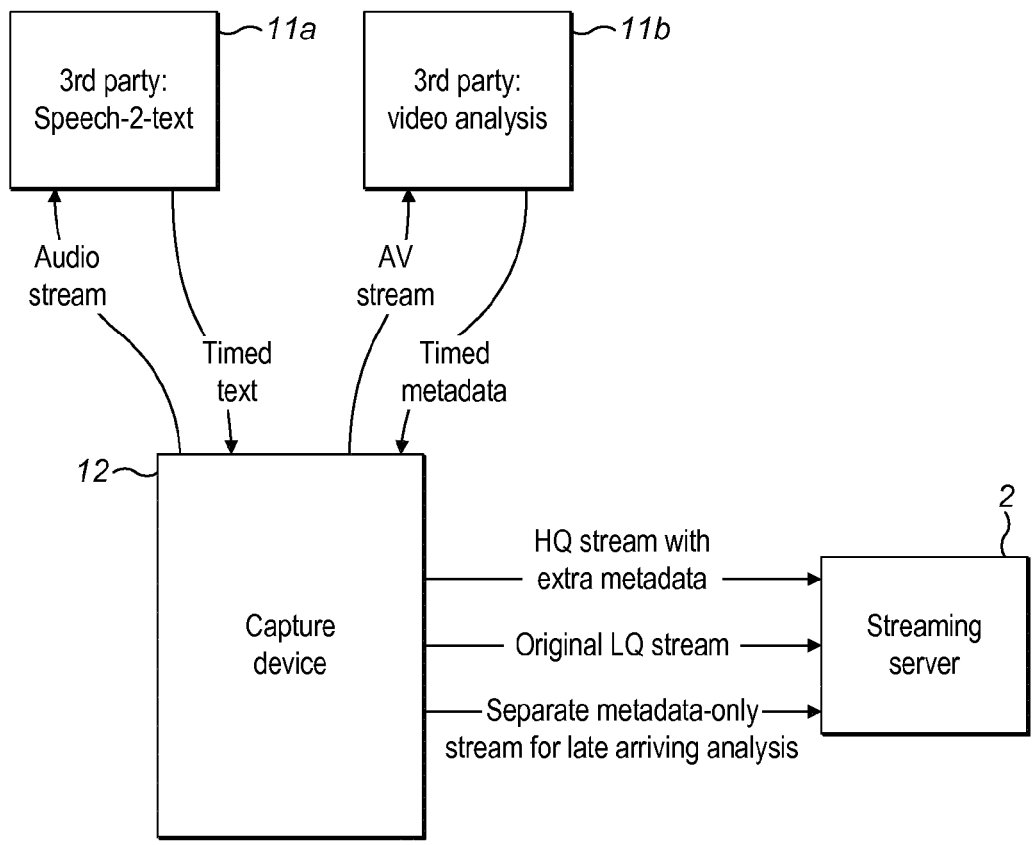
FIG. 3 illustrates an exemplary system in which content is augmented.

FIG. 3 illustrates the augmentation of data. The capture device, in this example the capture device 12a, is connected to the server 2 as in FIG. 1. The capture device 12a is illustrated as connected to both data services 11a and 11b of FIG. 1. The data service 11a is a $3^{rd}$ party speech-to-text conversion entity, and the data service 11b is a $3^{rd}$ party video analysis entity.

The capture device 12a provides an audio stream to the $3^{rd}$ party speech-to-text entity 11a, and receives timed text back. The capture device 12a provides an audio-video (AV) stream to the $3^{rd}$ party video analysis entity 11b, and receives timed metadata back.

The capture device 12a may provide the original data stream (before augmentation) as a low quality (LQ) stream to the server 2, a high quality stream with extra metadata to the server, and a separate metadata only stream for late-arriving analysis to the server 2.

The metadata derived from the stream is sent back to the capture device as shown in FIG. 3.

Transcription (I)

The system may use speech-to-text conversion to determine what in the captured video stream is being said. The system may send the captured video stream to a processing server to receive a transcribed version of the audio signal of the captured stream. This transcribed version of the captured video stream may be used to generate further metadata which reflects what has been said in the captured video stream. The generation of the further metadata can be accomplished at the capture device. A user of the capture device as well as someone using a so-called director application on a second device used to curate the captured video stream which is to be published as a viewing stream may accept, edit or reject any transcribed text and/or the further generated metadata before it is accessible by the viewing stream.

When generating such further metadata the reach (i.e. discoverability) of the captured video streams can be broadened without any significant resource overhead. This method may improve the accessibility of the captured video stream which, for some provider or publisher of the captured video stream, may be highly desirable or, in some cases, a legal requirement.

Storing transcribed text and the further metadata generated based on the transcribed text also makes the video stream more searchable either in real time for viewers to find streams live right now or, where streams are saved for on-demand playback, when searching the archive.

The method may also be used by the user of the capture device, which might be a contributor, to broaden the reach of the captured video streams. The method may help to improve discoverability when a user of a capture device is contributing captured video streams to a large pool of material.

The method may also be used to enable the consumption of the viewing stream without necessarily having the audio on. Certain kinds of viewers of video streams are watching while listening to other things (e.g. music). By adding the audio transcription automatically to and/or generating and adding further metadata reflecting the audio transcription of live content, there may be brought a higher level of convenience to the consumption of this type of viewing stream. It may be easier for viewers to find live or on-demand content if it can be searched by what is being said.

Thus, speech recognition may be used to determine what any given contributor is saying. Each such contributor, or someone using a so-called 'director app' to curate a published stream may accept, edit or reject any transcribed text before it is accessible to viewers.

This broadens the reach of the content without any significant resource overhead. This improves the accessibility of content which, for some publishers, may be highly desirable or, in some cases, a legal requirement. Storing transcribed text also makes content more searchable either in real time for viewers to find streams live right now or, where streams are saved for on-demand playback, when searching the archive.

For a contributor, this broadens the reach of the content, and improves discoverability when a user is contributing content to a large pool of material (e.g. a citizen reporter use case)

For an end user, this gives ability to consume content without necessarily having the audio on. Certain kinds of content are watched while listening to other things (e.g. music). Adding audio transcription automatically to live content brings this level of convenience to the consumption of this content type. Easier to find live or on-demand content if it can be searched by what's being said.

Transcription (II)

Cloud sourced translation of content may be used as a method of creating metadata.

A similar approach could be taken where the system may allow the process of the captured video stream being provided to a distributed network of foreign language speakers who are able to give live translations. This may be used to augment the original captured video stream either with spoken word translations or subtitles. This may be useful for broadcasters using the system to offer alternative language and to broaden the reach with less risk due to up-front costs associated with hiring staff. The method may be used to generate a large quantity of live content (e.g. news, current affairs, business) and to offer the captured live video streams to viewers in a number of languages. It may be used to offer them in combination with further metadata that provides the information about the captured video stream in alternative languages. The method may also be applied to augment captured video stream and the associated metadata with subtitles and/or audio description and to provide them to viewers who are hard on hearing or with sight problems.

A broadcaster generates a large quantity of live content (e.g. news, current affairs, business). They wish to offer this content to viewers in a number of languages but lack the resources to hire dedicated staff to provide real-time translations. While the live content itself may or may not be distributed to end-users via our system, the content could be provided to a distributed network of foreign language speakers who are able to give live translations. These contributions can then be used to augment the broadcaster's original language offering either with spoken word translations or subtitles. This adds the ability to cloud-source different languages.

For a customer, this alters the ability to offer alternative languages with no up-front costs associated with hiring staff and broadens reach with less risk.

For an end user (contributor) a foreign language speaker gets to use their skill to improve content using simple tools.

For an end user (viewer) this provides an option to enjoy content in their own language irrespective of the source language.

Another example of a metadata service which may be provided by blocks 11a or 11b is a cloud sourced translation of content. If, for example, a broadcaster generates a large quantity of live content (such as news, current affairs, business), they may wish to offer this content to viewers in a number of languages. However they may lack the resources to hire dedicated staff to provide real time translations.

While the live content itself may be provided into the content service of the server 2, the content may also be distributed to a network of foreign language speakers who are able to give live translations. These contributions can then be used to augment the broadcasters' original language offering either with spoken word translations or subtitles.

As denoted by step 90, the capture device receives a response to its request to third party services, and includes any response it receives in the metadata for the content being streamed.

As denoted by step 92 the capture device transmits a data stream, and in step 94 the capture device also transmits a metadata stream.

The metadata stream may be transmitted in conjunction with the data stream, for example using multiplexing. Alternatively the metadata may be transmitted on a stream separate to the data stream. The metadata may also be transmitted on multiple separate streams in addition to the data stream.

The metadata and the captured data may be synchronised, particularly where the metadata is automatically generated. Thus the server 2 is able to recover any synchronisation information, and synchronise the metadata with the associated data content.

The metadata and captured data may be associated with a common timeline, and the server 2 is able to determine this timeline and synchronise the captured date and the metadata. The timeline may be provided by the captured data stream or from one or more of the metadata streams.

The metadata associated with data content is utilised by the content service associated with the server 2, in order to generate viewing streams for viewing devices 16a, 16b. The captured data streams from the capture devices are thus routed to the viewing devices in dependence on the metadata associated with the capture data streams.

The viewing device may be a moderator of content or an editor of content, which uses the metadata in order to moderate or edit the content provided on a viewing stream.
Watermarking In addition to generating the metadata for the content data stream, a capture device may also provide additional control level information for the content data stream by, for instance, using "watermarking". The watermarking is a type of metadata, and may be used, for example, to provide control level information.

Figure 4:
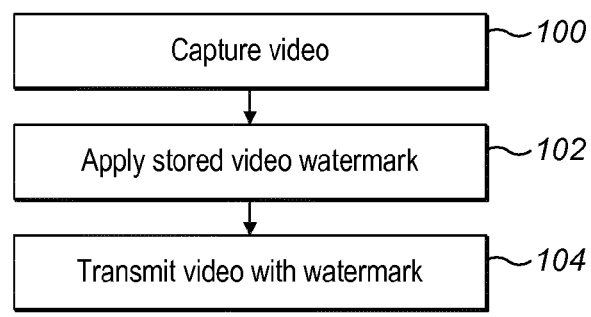
FIG. 4 illustrates an exemplary watermarking process.

This is further explained with reference to FIG. 4.

In a step 100 the video is captured. In a step 102 a video watermark stored in the capture device is applied to the video. In step 104 the video is transmitted in a data stream with the watermark applied. The watermark provides additional metadata for the content.

Figure 5:
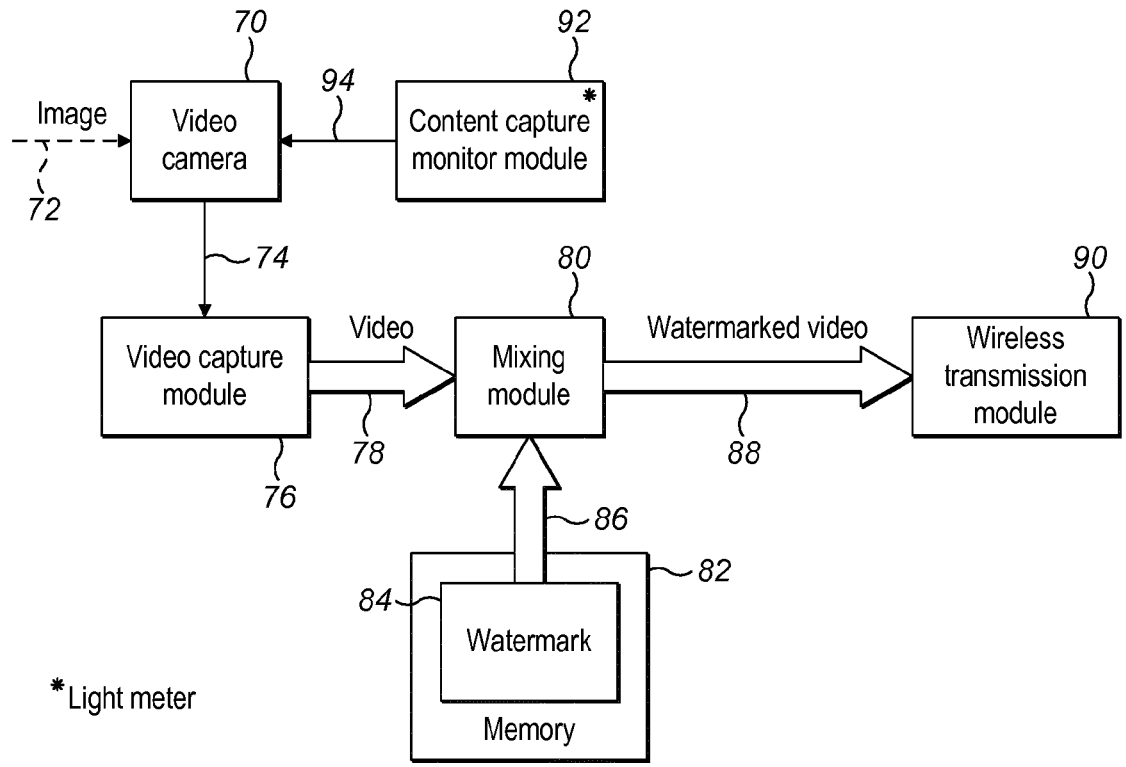
FIG. 5 illustrates an exemplary system for watermarking.

As shown in FIG. 5, a capture device such as capture device 12a may additionally be provided with a video camera 70, a content capture monitor module 92, a video capture module 76, a mixing module 80, a memory 82 including a watermark store 84, and a wireless transmission module 90.

The video camera 70 is the video camera of the capture device which films an image, and it generates a signal on line 74 to a video capture module 76. The video capture module 76 generates the video images on line 78 to the mixing module 80.

In addition the mixing module 80 receives watermark information from the watermark store section 84 of the memory 82. The mixing module 80 is therefore able to generate a copy of the video images on signal lines 88 which include the watermark, which may be referred to as watermarked video. The watermarked video is provided to a wireless transmission module 90 for transmission as the data stream.

The watermark encodes information that identifies the device on which the content was captured, the owner of the device, and a moment-by-moment reflection of the time at which the content was captured.

All streams are watermarked. All streams have metadata that describes the content. Rights are assigned to streams that have particular metadata characteristics. These rights are checked by detecting the watermark and determining which rights were assigned.
Video Watermarking Rights to content originating from certain public events such as sports matches, tournaments, music concerts and festivals, amongst others, are typically held by broadcasters, publishers and other similar organisations.

The proliferation of live-streaming apps on consumer devices however has made it increasingly easy for people to capture and distribute content that impinges on these rights. While some users do this unwittingly given the simplicity, convenience and fun of doing so, others do so maliciously.

Whatever the intention, these streams will necessarily dilute the rights holders' own output and may even damage the brand of the publisher or of the event itself.

Clearly, users are not required to use the described content delivery application to capture live content and they may use a competing platform that does not check for potential rights infringements. Moreover, content that did originate in the described content delivery application, and which was approved, may be legitimately redistributed elsewhere (e.g. someone reposts an authorised clip on Facebook)

It would be beneficial therefore if the rights holder had some way of determining whether a suspect live stream, recording or clip originated from an approved stream or not. Unapproved streams could be flagged as potentially infringing and a take-down request issued.

Moreover, with the growing popularity of live streaming, it would be beneficial if the servers manipulate the video data as little as possible as this would become cost prohibitive.

Watermarking is a process by which content is altered in such a way that, while imperceptible to the intended audience, is detectable by specialised software.

Such watermarks can be based on a manipulation of the audio, video or both. In our case, adding a watermark to the video seems the most sensible since this is the primary sense of the content and, therefore, the part most likely to need protecting.

Traditionally, watermarks are added to content using custom hardware designed specifically for that purpose. But, as highlighted in the introduction, providing this as a server-side function for the multitude of live streams the users produce would not be practical.

Our intention here is, instead, to create a system by which the recording device (the smartphone or tablet) adds the watermark itself.

This creates some additional technical challenges which need to be overcome. Importantly, the watermarking process must be lightweight enough not to create a significant processing overhead on the consumer device while being computationally complex enough to be difficult to fake.

While it is important that watermarks cannot easily be removed, it is similarly important that the watermark be difficult to transpose from a genuine stream to an unapproved one.

Traditionally, a malicious user would wish to remove watermarks entirely, but in this scenario in order to avoid a take-down notice, a watermark needs to be present.

Modern consumer devices have GPUs that rival those found in many desktop and laptop computers and, as such, it would be useful if any video manipulation performed by the device could be achieved by a combination of GPU operations. This would reduce overall processing load, but also optimise the watermarking process.

It is similarly important to ensure that any watermark added would survive a transcode or re-encode process.

A popular approach that fits these requirements uses variations in the chrominance of the video. This process is well known and is not covered here. Essentially, of the two parts of an image—chrominance and luminance—changes in chrominance are perceived least by human sight. As such, it is a useful property to vary in order to embed information or markers.

Moreover, consumer devices all provide fast GPU-based routines for manipulating it making the technique practical.

Having watermarked each stream, the server maintains a list of those streams which have been categorised as belonging to a rights holder's event and, further, which have been approved or not.

Streams not belonging to any event are allowed through en masse, as are those which are assigned and approved. Those which are not approved are not published.

When a piece of content is discovered on the Internet, in whatever form, it can be analysed to determine if it may belong to a rights holder's event. The techniques for doing so are covered elsewhere.

Identified streams are then checked for a watermark.

Streams without watermarks are either submitted for manual checks to ensure they are of the event before a take-down notice is served, or used to issue such notices immediately if there is a high level of confidence in the event inclusion assessment.

Streams with watermarks can be checked to see if that watermark was an approved one for that event. Unapproved ones follow the process described immediately above; approved ones are fine to be left alone.

In this way, the system offers an automated process for watermarking, grouping streams into events and validating content as either having been expressly permitted or not.

This gives rights holders a means by which they can keep on top of the huge numbers of UGC minutes being created that currently go unchecked, unmonetized and unmanaged.

Adding watermarks to Video Content

Watermarks are preferably added to audio-visual (AV) content at the point of capture by the capture device itself, e.g. by an iPhone. See the architecture sketch at the end.

Watermarks are small amounts data embedded into the audio, video or both aspects of captured content. They are added to the content in such a way that they are invisible/inaudible to the audience, difficult to remove but readily detectable technically. Technologies for applying watermarks already exist and typically operate by embedding at a rate of a number of bits per second. So a watermark that is 512 bits long will need twice as much content for one embedding than a 256 bit watermark.

The watermark data in our case comprises two elements: a watermark identifier (WID) and a timecode (TC). Each is included with every embedding, with only the TC portion changing.

Watermark Identifier

Each stream has a unique watermark identifier (WID) which is calculated as follows:

$$\text{sha-256(deviceId+userId+streamId+startTime)}$$

Figure 6:
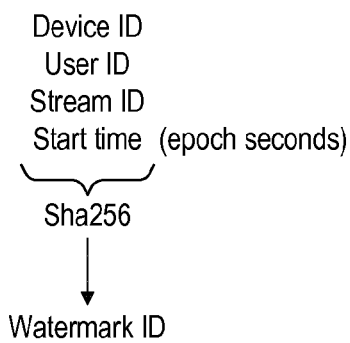
FIGS. 6 to 10 each illustrate an exemplary aspect of a watermarking example.

This is illustrated in FIG. 6.

This creates a small amount of data, 256 bits, that can be used by the chosen watermarking technology to embed the watermark in the content.

A hash of the values is used, rather than the values themselves, for two reasons:

1. Using each value directly would result in too much data for the watermarking technology to embed quickly; and
2. Since watermarks are intended to be easy to detect, using the values themselves might allow too much personally identifiable information to be read by unintended users.

Privacy

For any user who picks up their mobile device to shoot content, the possibility that what they capture may be claimed by a Rights Holder might, at first, be an uncomfortable prospect.

Clearly, there are matters of user privacy to consider but also the potentially overbearing impression that claiming streams for Rights Holders may create.

To alleviate these concerns, the watermarking capability has a number of built in safeguards.

Firstly, the WID does not contain any information that would allow the specific user to be identified, nor can the information encoded into it be reverse engineered to reveal such data.

Secondly, the system always makes the initial assessment of whether a stream may fall under a Rights Holder's control. If the stream's metadata (e.g. time, location, content of the video) suggests that the stream may be one to protect, only at this point may a human moderator acting on behalf of the Rights Holder get involved.

Thirdly, moderators are only shown the stream itself. No personally identifiable information about the user shooting the content, other than anonymised data regarding their reputation/standing/rating.

Fourthly, moderation may, in some cases, be accomplished by entirely automated processes.

Figure 7:
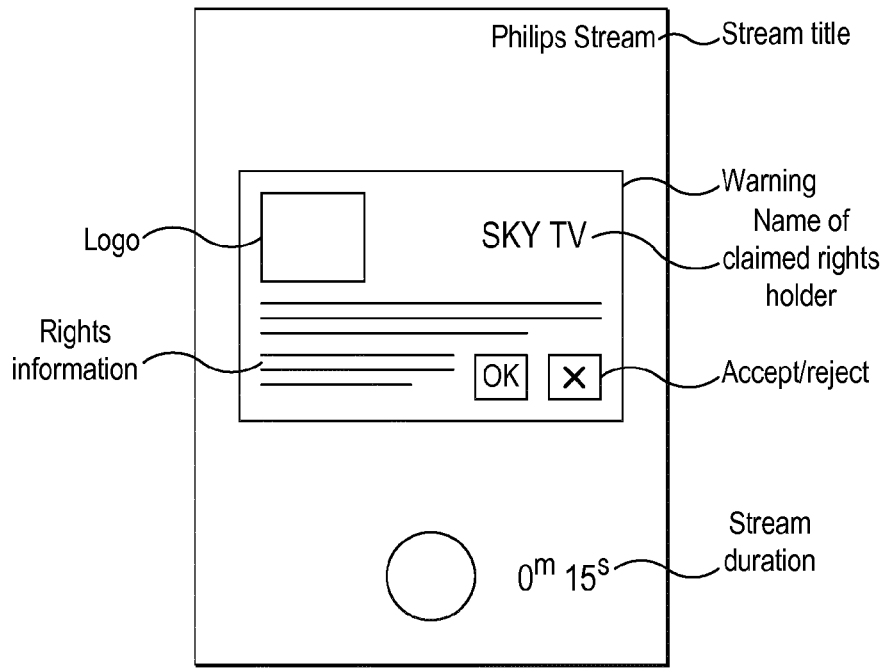

Fifthly, when the system makes its initial assessment of potential Rights Holder control, and again if a moderator affirms this, the user is shown a warning message to communicate this on their capture device (as illustrated below). This shows the name of the Rights Holder, the nature of the rights claim, any supplemental information about how the content may be used and a button to allow the user to stop shooting content if they are unhappy for the content to be used in this way. If they are not, then the stream is stopped and any recording of it is discarded. This is illustrated in FIG. 7.

Timecode

Figure 8:
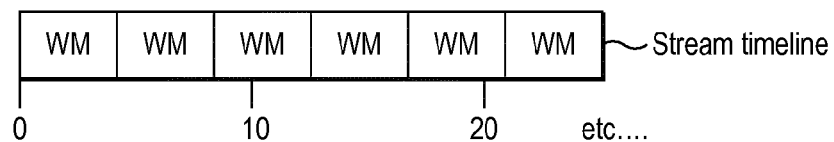

The watermarking technology embeds the WID, which does not change throughout the entire span of a continuous stream of content together with a timecode. The TC value begins at zero at the start of the stream and measures the offset into the stream at which each successive watermark is embedded. This is illustrated in FIG. 8.

Figures 9, 10:
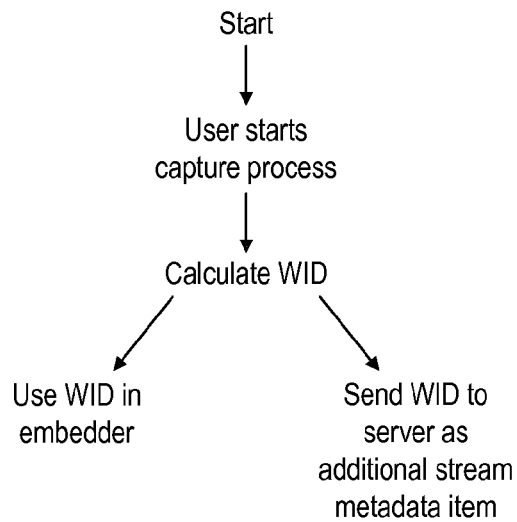

How are watermarks used? When a capture device begins capturing content, the WID for this stream is calculated and sent to the server as another item of metadata to associate with it. This is illustrated in FIG. 9.

If, by whatever means, a Rights Holder determines that a stream comprises or contains content that they own then a record is kept to indicate this. This record includes at least the event to which the Rights Holder claims the content belongs, the stream in question, its watermark identifier and, optionally, any start and end times within the stream demarcating the section of content to which the Rights Holder claims ownership. This is illustrated in FIG. 10.

Using watermarks to Prove Ownership

Suppose a Rights Holder is somehow made aware of a piece of content that they believe originated from a stream they marked as belonging to them but which is being distributed without authorisation. How can they assert ownership and begin the process of having the unauthorised content taken down?

By analysing the suspect content for watermarks, any such detected watermark can be detected and read off. This can be compared against the lists of watermarks for which the Rights Holder asserts ownership, as compiled above.

Figure 11:
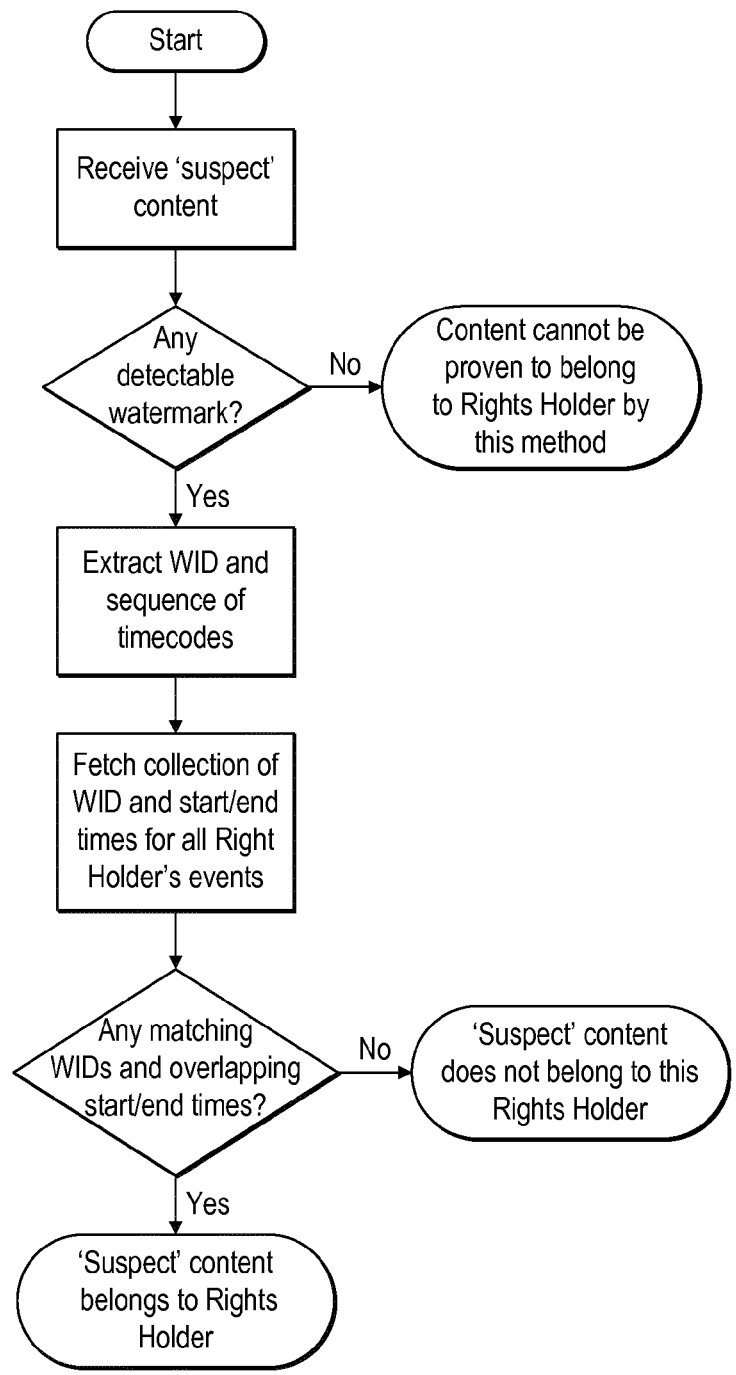
FIG. 11 illustrates an exemplary watermarking process.

If a detected watermark is included in any such list, then the rights holder can demonstrate that the clip was claimed by them as it passed through the describe content delivery system, may reasonably exert ownership rights and begin the takedown process. It may also be used to identify the user and source device if this is useful in determining the origin of the unauthorised distribution—it may not always be. This is illustrated in FIG. 11.

Figure 12:
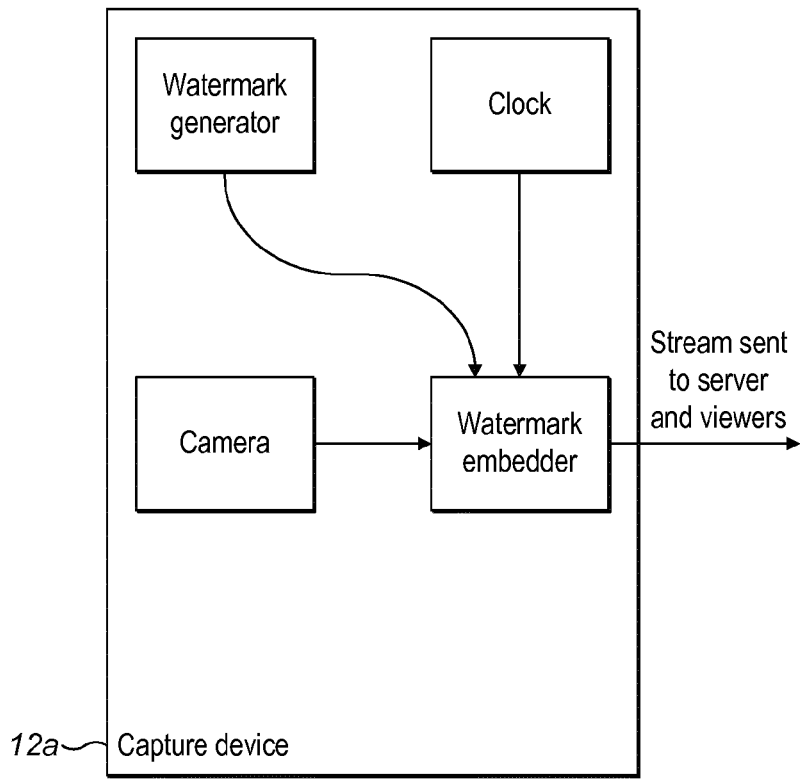
FIG. 12 illustrates an example of a watermarking system.

FIG. 12 shows the capture device architecture needed to apply watermarks to content.

Thus it can be understood that watermarking is a type of metadata, which may be used for example to provide control level information.

Figure 13:
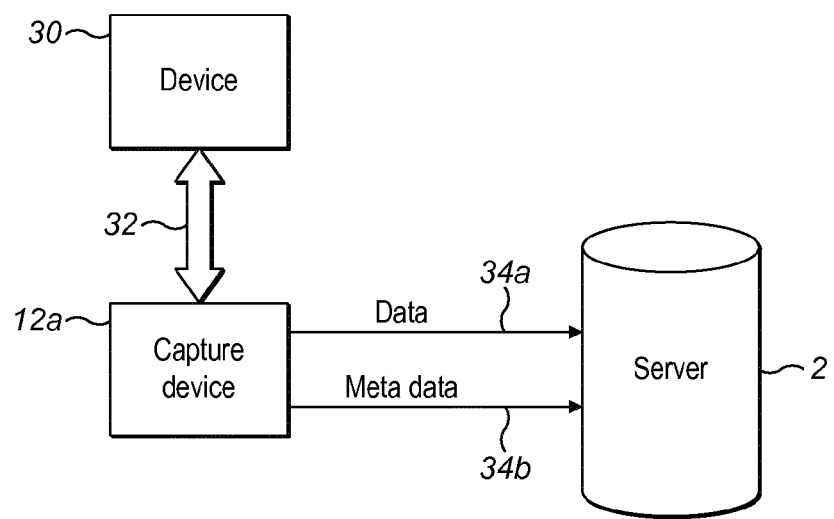
FIG. 13 illustrates an exemplary generation of metadata.

With reference to FIG. 13 there is illustrated an exemplary implementation of part of the arrangement of FIG. 1. The server 2 of FIG. 1 and one of the capture devices 12a of FIG. 1 are shown in FIG. 4. Additionally shown is a device 30.

In accordance with a preferred embodiment, the capture device 12a is configured to generate the metadata for a data stream which it captures. The capture device 12a is able to communicate with the device 30, if necessary, to obtain additional metadata associated with the captured data stream.

The capture device 12a is then able to generate the data 34a, associated with the for example a captured data stream, on signal line 34a, and its associated metadata on signal line 34b.

The data and the associated metadata on lines 34a and 36b are received at the server 2 as denoted in FIG. 2. As such, the server 2 does not have to generate the metadata for the data, and this task is carried out by the capture device which then simply transmits the metadata to the server.

In the example shown the metadata and the data are transmitted in two separate streams. In alternatives, the metadata can be combined with the data from transmission in a single stream, or there could be multiple data streams and or multiple meat data streams.

Synchronisation by Marker

Synchronisation can be achieved in some cases by looking at two or more streams, identifying a common audio or visual feature and aligning on those. The placement of these AV features could be part of the metadata (e.g. Player 10 joins the game at 01:13:42 on Stream A; 00:15:22 on Stream B; 00:40:11 on Stream C. Therefore these three streams can be aligned at this moment)

In summary, two or more media assets with different timelines may have those timelines aligned by comparing their metadata timelines.

Any assets whose metadata timelines contain related items may be aligned at this point.

Further, if assets A and B have a common metadata timeline item, and B and C have a different common metadata timeline item, then all three may be aligned even if A and C have no such item in common.

In the example architecture described it is necessary to synchronise the clocks on a collection of devices indirectly connected to each other over an unknown, unknowable, unreliable network (i.e. the internet). The following describes a technique for achieving clock synchronisation that is accurate.

Events that capture content using a high frame rate or where frame-accuracy is important may need a carefully attuned clock such that the order of magnitude in the uncertainty is manageable.

Any solution that relies on a device contacting a server over the internet will run into the issue of being able to measure the round trip time between the two but being then unable to break this down into outward and return journey times—information that is vital to being able to synchronise exactly.

In order to improve on this accuracy for devices that are near each other we must therefore look elsewhere.

A simple example is now set out.

Imagine two iPhones next to each set-up to capture video. Their clocks are not synchronised and they are connected to the internet over an unstable cellular connection making their NTP assessments significantly inaccurate.

Consider that they are both looking at a digital clock that shows the time in hours, minutes and seconds.

A remote viewer, receiving the streams from the two phones, could very easily align them so that they were synchronised simply by observing the times shown on the clock and by watching for the moment the seconds value ticked over.

We can use a similar, albeit more sophisticated approach here.

The goal of synchronisation is not to align a set of capture devices with a remote clock—that's one method by which things can be synchronised, but it isn't the objective. The goal is to play out each captured stream so that as each frame plays out, it is shown alongside frames from other streams captured at the same moment.

In this way, if we can somehow align all the capture devices, their synchronisation (or lack thereof) with the time at the central server is largely irrelevant.

To achieve this synchronisation, we must look for markers that are common to each stream, or a series of markers common to overlapping subsets of the streams.

In our facile example above, the digital clock was the marker, but in a real-world situation, a marker might consist of a TV image caught in the background, the position of a moving object a camera flash; or a sound such as the start of a song, a round of applause, the text a speaker is reading, a starting pistol; or an electronic beacon like a Bluetooth ping.

Each capture device, being situated in the same time domain as the marker can safely assume that they heard/saw the event at the same time. Having identified and described the marker, they can compare the state of their clocks at this moment and calculate the matrix of their relative offsets.

This matrix need only be evaluated once for any unique selection of capture devices. It would only need to be done again if a new device joined the event.

Sound markers may be picked out using frequency spectrum analysis with the profile of interesting events used to compare markers between devices.

Video analysis, as described in No. 6, could likewise be used to achieve a similar result.

Bluetooth pings offer a unique possibility in that they can be produced by a device at will rather than having to wait for a marker to occur naturally. Moreover, particularly with Bluetooth Low Energy, timings for data in transit are well known.

While such broadcasts are limited in range, it would be possible to create ad-hoc cells of nearby devices which synchronised amongst themselves first and then between cells secondarily.

Sound is the least reliable marker source when used in large open spaces as the speed of sound becomes a significant overhead.

Text recognition within video data could be used to look for digital clocks appearing in frame.

Earlier, I mentioned the possibility of using a number of overlapping markers to synchronise a large number of devices. A set of devices can be set to form a synchronisation group if they share access to a common marker, but that some members of the set may also share markers with other groups and in this way synchronisation between groups/cells may be achieved.

Grouping Using Metadata

The architecture of FIG. 1 allows consumers to broadcast live video captured on their mobile handsets (phones, tablets and so on). Often these broadcast sessions are short, informal but topical, personally meaningful or entertaining and, as such, they are shared with friends and followers—usually automatically—on social media.

However, while this makes it easy for a consumer's connections to watch along in real time, it does little to allow these moments to propagate any further. Moreover, the casual nature of video capture makes it easy to record material that might infringe upon the rights held by a more traditional broadcaster. Sporting events are a good example of this.

There are therefore two competing problems: how to identify groups of streams as belonging to a particular event but also being able to pick out from these identified streams those which potentially infringe on pre-existing rights held by another.

A typical set of use cases for live streaming includes public events where a large number of people are gathered together—sports, music concerts, school/university events, parades etc. . . . .

In these situations, while each contributor may create shareable moments captured by their own device and passed around their own connections, it may be useful for a viewer to be able to engage with the event as a whole and watch content contributed by anyone present. Similarly, for events tagged as belonging to a rights holder, these overlapping video sequences would be a valuable source of user-generated content that could be moderated for compliance with the protected brand's guidelines, monetised directly or used within traditional broadcasts.

Given a technique that can aggregate streams in this way, an event could be effectively packaged as an aggregate of each user's micro-broadcast contributions.

An added advantage is that moments which, on their own, might seem trivial and banal may take on extra colour and relevance when slotted into the bigger picture around them.

It is thus desirable to address how a collection of user generated live streams can be analysed such that it is possible to identify from amongst them one or more events, and how a rights holder can describe an event they control to the system such that it is subsequently able to assess identified events as being potentially infringing so that this content can be managed by the rights holder.

The first issue to address in seeking to provide such a feature set is being able to identify clusters of user generated content as comprising an event, and thus place data streams into groups.

It is not necessary for the system to know about expected events in advance—the example creates a system that can pick out events from a collection of data streams using only the data available from these streams and the devices capturing them.

An event can be said to have both geographic and temporal boundaries. In this way, while the system may identify a dozen streams coming from a given location, if they are not tightly bound to a specific time period then this collection of content cannot indicate the occurrence of an event. However, a dozen streams, for example, from a certain locale within a short time period might imply the existence of an event. The important point here is that the identification of a meaningful cluster of contributions is based not just on geographical bunching but also by time.

There exist many algorithms for identifying the presence of data point clusters, but one exemplary algorithm which may be used is a three-dimensional DBSCAN (where the three dimensions used are latitude, longitude and time). This allows for non-uniform, asymmetric clusters to be identified and is therefore better suited to identifying likely groups of people. Using time as the third dimension is acceptable as it is a continuous, rather than a discrete, quantity.

One adaptation to DBSCAN that it is needed to allow the time variable to have an extent instead of a single value. Techniques to permit this exist.

Examples can be readily envisaged where independent users (independent content creators) can be located together. For example, a baseball field where spectators are unevenly distributed largely over only three sides of the field. A cluster here might resemble a horseshoe. Alternatively, a festival where attendees are concentrated in pockets around different stages or performance areas presents a different pattern of user densities. Similarly, a linear race that does not lap would comprise a locus of connected areas of similar density. Such a scan allows these individual events to be picked out from the surrounding noise.

The system can identify the likely contributors, and then create a macro-event to collate the individual streams into a group so that a searching viewer can pick up on the full set of clips.

If the content is only ever live, i.e. no streamed data is ever retained for later playback, then the first contributions that permit the system to identify the event may not be seen by searching viewers if they are over and done with by this point. However, with a density algorithm like DBSCAN, even data points representing expired video sessions are still valuable in defining and bounding an evolving event.

Whilst examples are described with reference to live streams from live events, the described techniques are not limited to streams that are live and live only. If the system supports the recording of live streams, then any stream identified as being part of an event can be watched whether currently live or not. Moreover, it would then be possible to recap an entire event using a montage of identified streams.

Viewers or rights holders searching for content can subscribe to an identified event and watch live streams as they become identified as belonging to it, by accessing the appropriate group. In this way, the event is not constrained by the end of any one particular contributor's stream, and the viewer can choose to watch any such stream or not. Streams may also overlap.

There are certain locations in which people often gather together for one kind of event or other. This includes stadia, conference centres, transport hubs, shopping malls, festival areas and so on. Past events, having been identified, can be used to improve the speed with which future ones are detected. This may not allow the system to work out the type of event (e.g. the difference between a football match on one day and a music concert on another day at the same stadium), but the ability to mark streams as likely belonging to an event sooner rather than later would ensure that more streams get correctly identified and included sooner.

Streams belonging to the event, identified sooner, means that the customers gets to start showcasing their event to viewers quicker. Early streams that might have been missed or excluded from the event are now more likely to get correctly identified and tagged meaning that a customer's 'event pages' carry a more complete picture of the event.

Content that should be featured in an event owner's content pages will not be overlooked. More viewers for content are obtained when it becomes included within an event owner's pages. More chances of kudos at being featured by the event owner. Fewer missed moments from an event.

A further technique to determine whether a particular contributor's stream belongs to an event or not may involve the use of a GPS device, gyroscope device, and an accelerometer device of contributing users' devices.

While capturing video, location and location data, the consumer device should ideally also record the direction and scope of the capture device's field of vision, preferably no less frequently than once per second. This additional information can be added to the metadata of the data stream.

By tying this information to the timed captured video data, it is possible for the system to further take into account the point or focus of points that may form the focus of a group's attention within a period of time.

Figure 14:
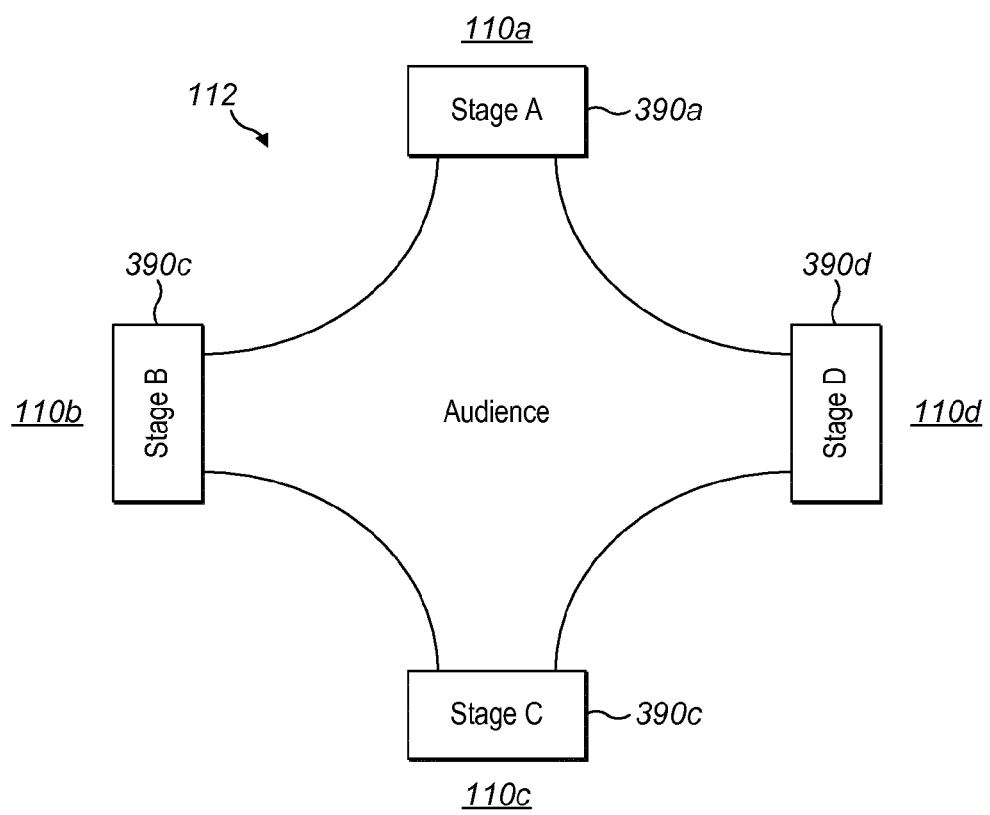
FIGS. 14 to 16 illustrate an example relating to grouping.

In a music festival example, comprising four stages arranged around a central area, the central mass of festival goers would, using only the DBSCAN technique noted above, be considered a single cluster. This example is illustrated in FIG. 14. The Festival environment 112 comprises an upper stage Stage A denoted 110a, a left stage Stage B denoted 110b, a lower stage Stage C denoted 110c, and a right stage Stage D denoted 110d.

A small number of nearby contributors would be picked out from the audience. Collating video clips and streams from the entire group would create a confusing jumble of video taken of all four stages.

However, if the field of view of each contributor is also taken into account, then what was considered as one cluster is actually identified as being multiple clusters. Taking the same set of nearby contributors, one subset is seen likely to be looking at the stage on the left, Stage B 110b, whilst another is seen as looking likely at the stage at the top, Stage A 110a.

Figure 15:
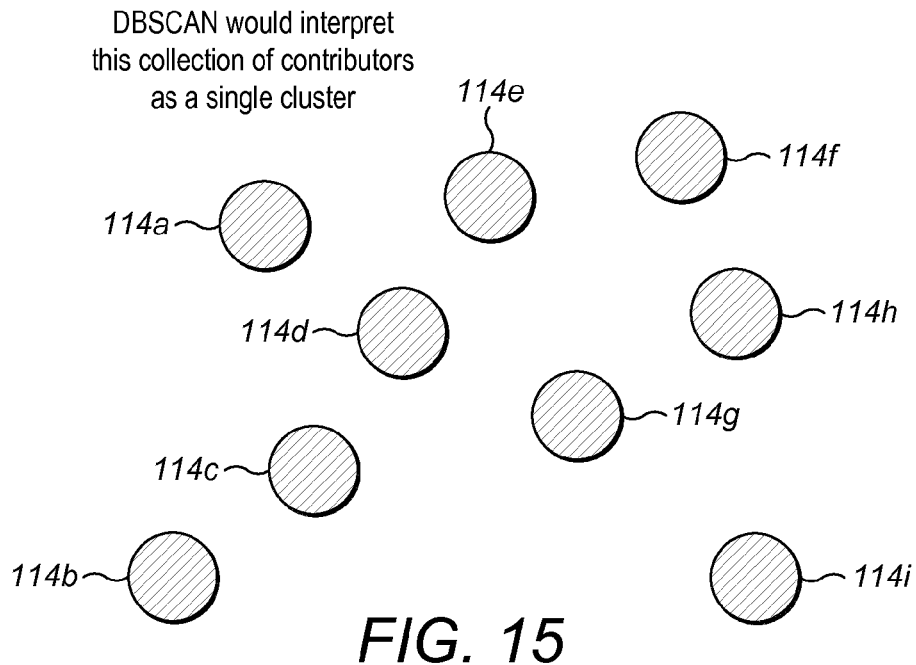
Figure 16:
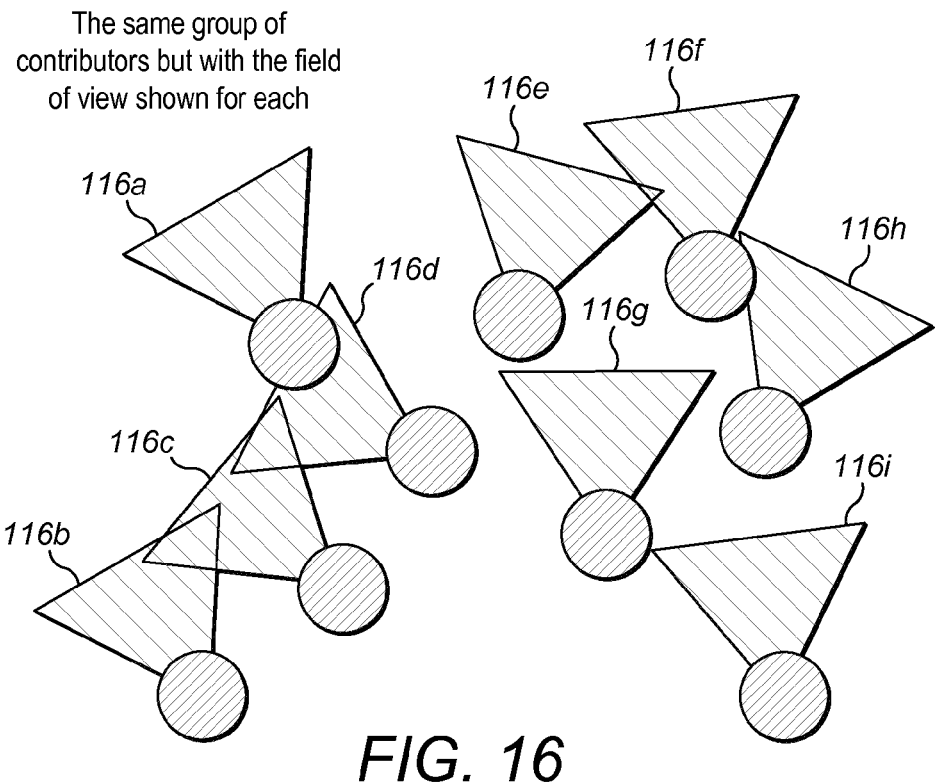

This is illustrated in FIGS. 15 and 16. Each capture device 114a to 114i has a corresponding point-of-view or field of vision denoted by reference numeral 116a to 116i respectively.

Being able to further describe each contributor in this way allows the contributed video, or portion thereof, to be attributed to the correct sub-event within the event.

Using this as a fourth variable in the DBSCAN analysis, it is possible to differentiate between contributors and, in so doing, maintain event integrity by more accurately speculating as to which event any given contribution belongs.

Of course, the data will contain some noise, but this fourth variable being an angle is just as usable within DBSCAN as latitude and longitude.

It may also be useful to extract from the content two other types of real-time metadata: namely, what is heard being discussed and what is seen appearing in the video.

This audio-visual analysis may be valuable in two ways. Firstly, to provide a running set of keywords or tags that describe the content and which in turn aids both discoverability and the system's ability to include or exclude a stream, or portion thereof, in an event. Secondly, if a rights holder has a declared interest in content arising from an event, knowing what is actually being captured allows for a more accurate assessment of whether a particular stream infringes.

On this second case, consider an example before looking in detail at how a rights holder might declare an interest in certain content.

At a football match a user broadcasts his friends enjoying a beer in the bar. While his geography, camera angle, and time might all suggest that his stream ought to be managed by the entity that owns the rights to the football match, clearly the content of the stream indicates otherwise. An evaluation of the content of the stream would allow the system to make this assessment.

It is well-known that automated semantic analysis of text yields a list of topics, entities, themes, moods, etc. . . . The same analysis can be performed in real-time with live video by using a speech-to-text conversion. While the spoken word is structurally different from written language the aim here is not to deduce the nuances of what is being said, but rather to use a 'bag of words' approach and highlight merely what is being mentioned.

Similarly, there exist services that analyse video content for the appearance of recognisable objects, traits, settings etc. . . that can be used again to create a live stream of metadata that describes the content.

So as described above, a wealth of as-it-happens metadata about a collection of live streams can be created. This can then be used to process the streams.

When analysing a collection of streams, location, time and direction all play a part, but so too does a coherence of subject matter. Going back to the music festival example above: one of the users capturing video might be recording herself speaking to camera. Being able to identify this characteristic of her stream would allow it to be separated out from those around her and excluded from the events focused on the performance areas.

Similarly, within a group of users filming a car race some users may turn away from the action during recording, or may be tracking a particular car. Knowing what happens in the video, the system can pick out just those contributors who are looking at the race or even at particular participants in the race.

With regard to the problem faced by rights holders, it is possible to see how the same approach can be used to pick out potentially infringing content from that which is likely not.

A rights holder is not encumbered with the task of reviewing every live stream that pops up in the location at a given time and checking it for infringement. While the techniques described so far would slim this list down, there is still the potential for a large number of streams to check.

When a rights holder wishes to declare an interest in an event, a way for them to be able to describe the parameters of this event beforehand is provided. This includes the ability to define a region within which the event will take place as well as time limits for its start and end. However it also includes the ability to provide a list of tags that can be used to match against content. By defining collections of tags that content must, may, ought not and must not contain in order to be included in the rights holders event, it is possible for much of the review process to be automated.

Figure 17:
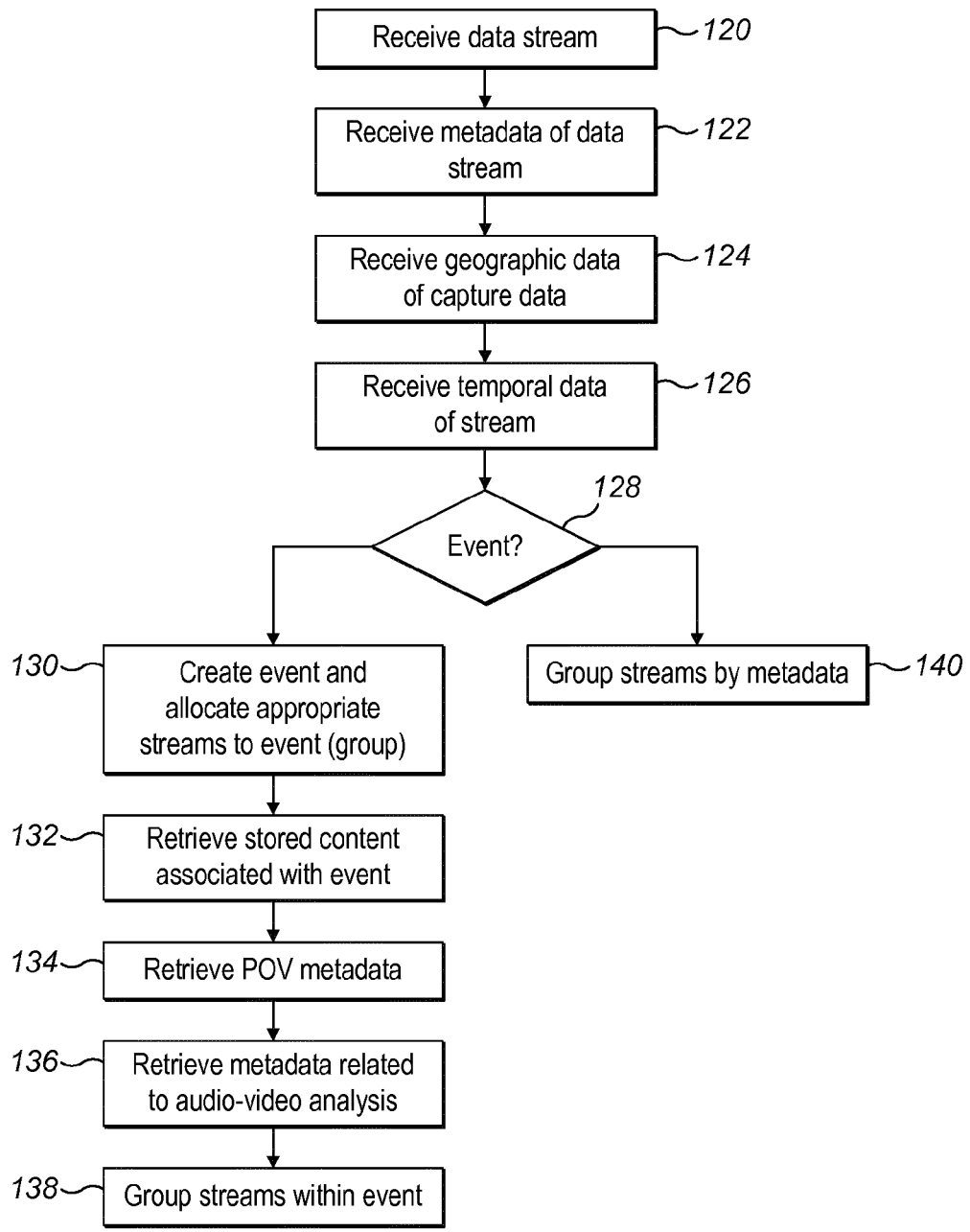
FIG. 17 illustrates an example grouping process.

With reference to FIG. 17, there is illustrated the steps in the process for generally grouping data streams, and in particular for grouping data streams as part of events.

In a step 120 a data stream is received at the server 4. In a step 122 the metadata for the data stream is also received at the server 2. The metadata may be received with the data stream from the capture device, or may be generated in the server.

In a step 124 geographical data of the capture device is retrieved from the metadata, and in a step 126 temporal data of the data stream is retrieved from the metadata.

In a step 128 it is determined whether an event is identified. An event may be identified when a plurality of data streams are determined to be located within a particular proximity of each other, and to have been generated within the same timeframe.

If an event is not detected, then the data streams are grouped in a step 140, in accordance with their metadata.

If an event is detected, then in step 130 the event is created and the appropriate data streams are allocated to that event, effectively being grouped according to the event.

In a step 132 any content which has previously been stored and which is also associated with the event is retrieved.

In a step 134 point-of-view information or field view information is retrieved for the data streams from the associated metadata.

In a step 136 metadata related to audio-video analysis of the data streams is retrieved.

In a step 138 the streams within the event are then grouped according to this additional metadata, to present groups within the streams.

Figure 18:
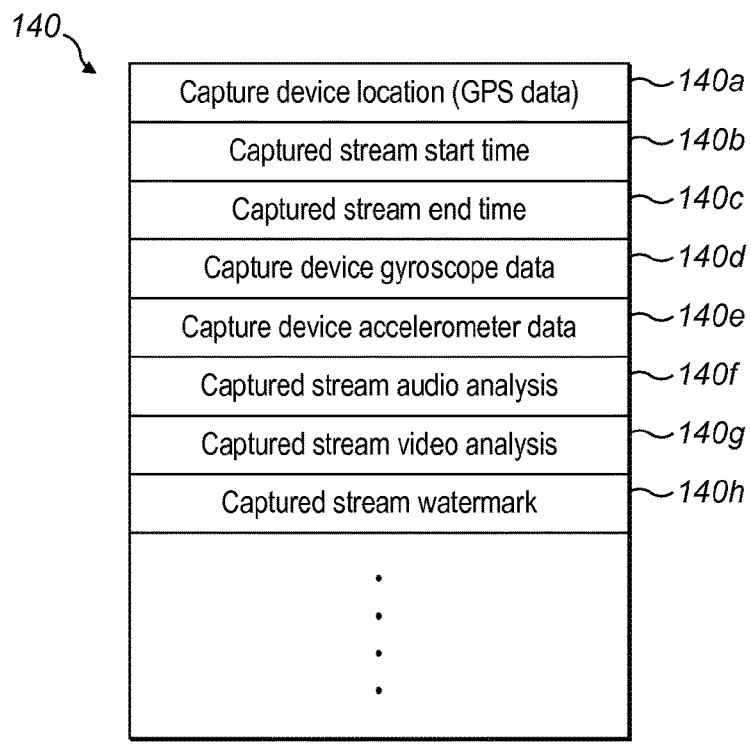
FIG. 18 illustrates an example of metadata.

With reference to FIG. 18, there is illustrated exemplary metadata 140 for a data stream. As shown in FIG. 9, this exemplary metadata 140 includes: capture device location (GPS data) 140a; captured stream start time 140b; captured stream end time 140c; capture device gyroscope data 140d; capture device accelerometer data 140e; captured stream audio analysis 140f; captured stream video analysis 140g; and captured stream watermark 140h. Additional information may also be included within the metadata according to the implementation.

As discussed above, the metadata associated with the content data may include a video watermark.

Figure 19:
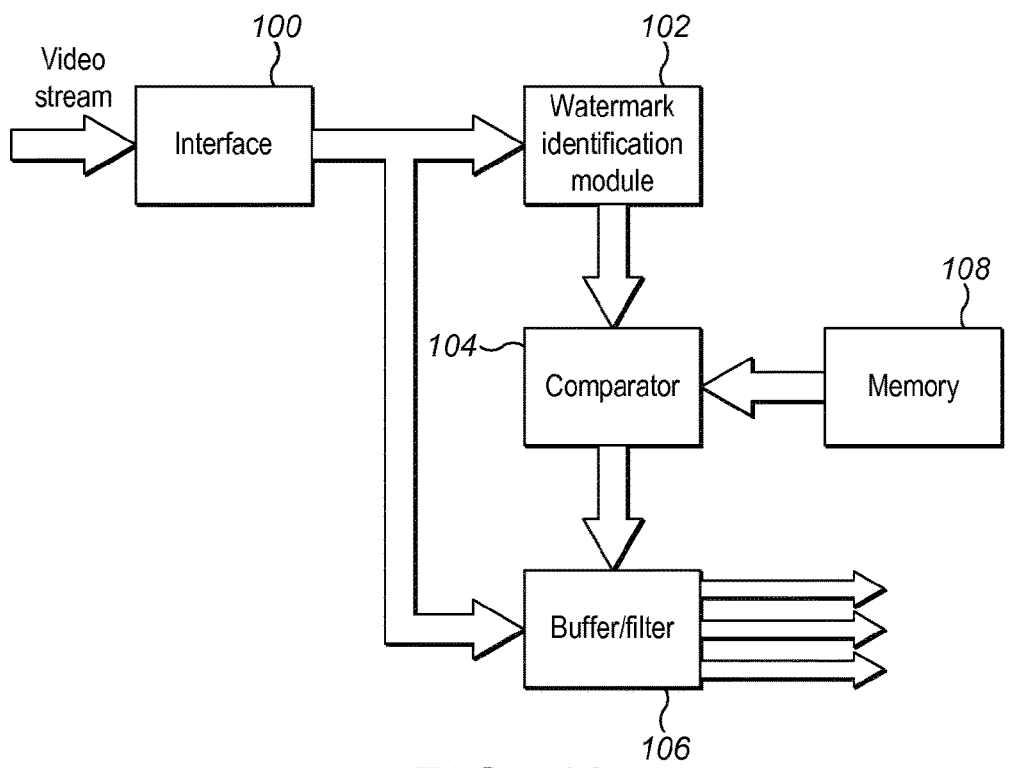
FIG. 19 illustrates an example relating to watermarking.

With reference to FIG. 19, there is illustrated a portion of the architecture of the server 4. An interface 100 receives the video stream which has been transmitted by a capture device. The interface 100 provides the video stream (including the watermark) to a watermark identification module 102, and to a buffer/filter module 106.

The watermark identification module 102 retrieves the watermark from the video stream including the watermark, and provides this retrieved watermark as an input to the comparator 104. A memory 108 also provides the stored watermark, which includes a store of the watermark equivalent to the watermark store 84. The comparator 104 thus compares the received watermark from the video stream with an expected watermark from the memory 108. If a match is indicated, then the comparator 104 provides an appropriate signal to the buffer/filter 106, with the buffer/filter 106 outputting the received video stream responsive to confirmation from the comparator that a match has been received, and thus the received signal is carrying the appropriate watermark.

The buffer/filter 106 may provide three outputs, in an example, which indicate that a "rights holder" associated with a video stream accepts the content as being part of their event and approves it, that they accept the content as part of their event but reject it, or that they may consider that it does not belong to their event and forward for further processing.

Thus incoming video streams at the server 4 may be grouped at a video streaming server. The grouping may be provided based on watermark recognition. The grouping may also generally be provided based on metadata. The described examples are not contingent on metadata having been generated by a capture device and received at the server 4 from the capture device The examples utilises metadata associated with a content data stream, but the metadata may be generated within the server 4 itself, or may be provided by a capture device which also provides the captured content stream.

As described, watermarks can be added to content at the time of capture, and are a form of metadata of the embedded variety. If each piece of content contains a unique collection of metadata embedded in this way, it becomes possible for a further system to use this metadata to uniquely identify each piece of content.

As such, it is possible to describe any segment of content using a combination of this identifying metadata and a pair of timecode values (a start and an end). This forms a segment descriptor.

A server may be configured to store collections of these segment descriptors. The server operator may create collections of segment descriptors for any purpose, but one such example use is for each collection to refer to segments of content that belong to a particular user. A further use might be to collect together segments that contain related content. A further use might be to collect together segments to which should be applied particular consumption limitations (rights management).

A further system may receive content from the internet, or any other source, and check if it contains embedded metadata that uniquely identifies it. If so, this system can determine if the source content ought to have had consumption limitations applied to it and, further, may assess whether those limitations have been breeched.

In so doing, this further system may be used to police breeches in consumption limitations.

In summary, this is a technique that allows embedded metadata (a watermark) to be used to determine if a piece of content was categorised as belonging to one or more groups.

Grouping can be used to enhance the delivery of content, with discovery being content driven. This allows content to go in search of viewers rather than assuming viewers will find it. This is especially important for live content that may not last long, or may be from a new contributor. In these cases, it is essential that content creators begin to see that their work is getting the best possible exposure so that they are encouraged to keep creating.

As viewers watch and engage with content, the system may maintain a list of characteristics that it thinks each viewer likes. It might do this by using the tags, descriptions, locations, or events a stream belongs to or specific metadata from the moments at which the viewer taps to say they like a stream. By whatever means, the system is able to track each user's tastes and preferences over time.

When a new stream begins and metadata about it becomes available, the system will match it to viewers who have liked similar things before. By sending a notification to those users to come and watch the new stream, an audience can be mustered for any stream. This means that the potential audience for a stream is not just the contributors' followers or friends, as is the case with existing platforms, but indeed anyone who might enjoy it whoever and wherever they are.

Topics/tags/themes/creators that are particularly interesting to a viewer can be followed. This gives the system an explicit signal to curate future content for the viewer that matches the topic/tag/theme or which comes from a followed creator.

For events that give rise to a large number of user-generated streams, this approach to discovery allows the customer to reach viewers and bring them to the content in a more meaningful, more personally relevant way. A viewer is not simply brought to the event's landing page within the content service but is, instead, brought to a stream that suits their tastes exactly.

From the foregoing it can be understood that a group of users can create an event into which they all contribute one or more live streams of content. Each member of the group may watch one or more of these streams. Guests, who can watch but not contribute, may also be invited to the event. It can be also initiated from one party (an event holder) requesting users to participate.

Use cases for this grouping include: corporate communication; panel events; private meetings where participants are not in one location; request for contributors to an event.

Grouping provides: secure communications; guaranteed quality of service, perhaps an optional SLA that makes the service reliable enough for mission-critical communication (e.g. the Delta use-case).

For the end user (contributor), grouping provides reliability; and is easier to use than person-to-person calling, content is added to the event.

For the end user (viewer), grouping provides a feel of being present at the event; and access to each contributor's stream.

Grouping may be adaptive. Adaptive grouping determines who should be invited to share that event as a contributor. In addition to the standard ways, geolocation of devices that indicates that a user is present can initiate a request to share the event. Different ways to define the grouping may be provided, e.g. 1.) the normal clear definition of members; or 2.) an open list whereas users matching with certain criterion (presence, profile, etc.) could define an adaptive list of potential contributors.

Grouping Streams

There exist several platforms that allow consumers to broadcast live video captured on their mobile handsets (phones, tablets and so on).

Often these broadcast sessions are short, informal but topical, personally meaningful or entertaining and, as such, they are shared with friends and followers—usually automatically—on social media.

However, while this makes it easy for a consumer's connections to watch along in real time, it does little to allow these moments to propagate any further. Moreover, the casual nature of video capture makes it easy to record material that might infringe upon the rights held by a more traditional broadcaster. Sporting events are a good example of this.

We therefore have two competing problems: how to identify groups of streams as belonging to a particular event but, likewise, being able to pick out from these identified streams that those which potentially infringing on pre-existing rights held by another.

A typical set of use cases for live streaming includes public events where a large number of people are gathered together—sports, music concerts, school/university events, parades etc. . . .

In these situations, while each person may create shareable moments captured by their own device and passed around their own connections, it would be useful for a given viewer to be able to engage with the event as a whole and watch content contributed by anyone present. Similarly, for events tagged as belonging to a rights holder, these overlapping video sequences would be a valuable source of user-generated content that could be moderated for compliance with the protected brand's guidelines monetised directly or used within traditional broadcasts Given a technique that can aggregate streams in this way, an event could be effectively packaged as an aggregate of each user's micro-broadcast contributions.

An added advantage is that moments which, on their own, might seem trivial and banal may take on extra colour and relevance when slotted into the bigger picture around them.

So the problems are: how can a collection of user generated live streams be analysed such that it is possible to identify from amongst them one or more events; and, how can a rights holder describe an event they control to the system such that it is subsequently able to assess identified events as being potentially infringing so that this content can be managed by the rights holder?

The first issue to address in seeking to provide such a feature set is the challenge of being able to identify clusters of user generated content as comprising an event.

It should not necessary for the system to know about expected events in advance—the idea is to create a system that can pick out events from a collection of streams using only the data available from those streams and the devices capturing them.

Before looking at the techniques involves, it would be useful to begin by defining an event, technically.

An event can be said to have both geographic and temporal boundaries. In this way, while the system may identify a dozen streams coming from a given location, if they are not tightly bound to a specific time period then this collection of content cannot indicate the occurrence of an event.

However, a dozen streams, for example, from a certain locale within a short time period might imply the existence of an event.

The important point here is that the identification of a meaningful cluster of contributions is based not just on geographical bunching but also by time. Ten drops of water a year does not a shower make; ten a second does!

There exist many algorithms for identifying the presence of data point clusters, but one of use here might be a three-dimensional DBSCAN (where the three dimensions used are latitude, longitude and time). This allows for non-uniform, asymmetric clusters to be identified and is therefore better suited to identifying likely groups of people. Using time as the third dimension is acceptable as it is a continuous, rather than a discrete, quantity.

One adaptation to DBSCAN that we do need, however, is to allow the time variable to have an extent instead of a single value. Techniques to permit this do exist.

Imagine, for example, a baseball field where spectators are unevenly distributed largely over only three sides of the field. A cluster here might resemble a horseshoe; alternatively, a festival where attendees are concentrated in pockets around different stages or performance areas presents a different pattern of user densities; similarly, a linear race that does not lap would comprise a locus of connected areas of similar density. Such a scan allows these individual events to be picked out from the surrounding noise.

Having identified the likely contributors, the system creates a macro-event to collate the individual streams so that a searching viewer can pick up on the full set of clips.

It should be noted that if the content is only ever live (i.e. no stream data is ever retained for later playback), then the first contributions that permit the system to identify the event may not be seen by searching viewers if they are over and done with by this point. However, with a density algorithm like DBSCAN, even data points representing expired video sessions are still valuable in defining and bounding an evolving event.

Note however that this invention is not limited to streams that are live and live only. If the system supports the recording of live streams, then any stream identified as being part of an event can be watched whether currently live or not. Moreover, it would then be possible to recap an entire event using a montage of identified streams. This in itself is a unique possibility.

Viewers or rights holders searching for content can subscribe to an identified event and watch live streams as they become identified as belonging to it. In this way, the event is not constrained by the end of any one particular contributor's stream, and the viewer can choose to watch any such stream or not. Streams may also overlap of course.

A further technique to determine whether a particular contributor's stream belongs to an event or not involves the use of the GPS, gyroscope and accelerometer of contributing users' devices.

While capturing video and location and location data, the consumer device should also record the direction and scope of the capture device's field of vision, preferably no less frequently than once per second.

By tying this information to the timed video data it is possible for the system, to further take into account the point or locus of points that may form the focus of a group's attention within a period of time.

For example, imagine a music festival that comprised four stages arranged around a central area, such as in FIG. 14.

The central mass of festival goers would, using only the DBSCAN technique noted above, be considered a single cluster as shown in FIG. 15 which picks out a small number of nearby contributors from the audience. Collating video clips and streams from the entire group though would create a confusing jumble of video taken of all four stages.

However, if we also take into account the field of view of each contributor, we can see that what looked like one cluster is actually multiple clusters as in FIG. 16. Taking the same set of nearby contributors, we can see that one subset is likely looking at the stage on the left, while another is looking at the stage at the top. Being able to further describe each contributor in this way allows the contributed video, or portion thereof, to be attributed to the correct event.

Using this as a fourth variable in the DBSCAN analysis, it is possible to differentiation between contributors and, in so doing, maintain event integrity by more accurately speculating as to which event any given contribution belongs.

Of course, the data will contain some noise, but this fourth variable being an angle is just as usable within DBSCAN as latitude and longitude.

It may also be useful to extract from the content two other types of real-time metadata: namely, what is heard being discussed and what is seen appearing in the video.

This audio-visual analysis may be valuable in two ways. Firstly, to provide a running set of keywords or tags that describe the content and which in turns aids both discoverability and the system's ability to include or exclude a stream, or portion thereof, in an event—more on this later. Secondly, where if a rights holder has a declared interest in content arising from an event, knowing what is actually being captured allow for a more accurate assessment of whether a particular stream infringes.

On this second case, let's consider an example before looking in detail at how a rights holder might declare an interest in certain content.

At a football match a user broadcasts his friends enjoying a beer in the bar. While his geography, camera angle, and time might all suggest that his stream ought to be managed by the entity that owns the rights to the football match, clearly the content of the stream indicates otherwise. An evaluation of the content of the stream would allow the system to make this assessment.

It is well known that automated semantic analysis of text yields a list of topics, entities, themes, moods, etc. . . . the same analysis can be performed in real-time with live video by using a speech to text conversion. While the spoken word in structurally different from written language our aim here is not to deduce the nuances of what's being said, but rather to use a 'bag of words' approach and highlight merely what is being mentioned.

Similarly, there exist services that analyse video content for the appearance of recognizable objects, traits, settings etc. . . that can be used again to create a live stream of metadata that describes the content.

So, armed with this wealth of as-it-happens metadata about a collection of live streams, how can we leverage it to solve our problems?

When analysing a collection of streams, location, time and direction all play a part, but so too does a coherence of subject matter. Going back to the music festival example shown above: one of the users capturing video might be recording herself speaking to camera. Being able to identity this characteristic of her stream would allow it to be separated out from those around her and excluded from the events focussed on the performance areas.

Similarly, within a group of users filming a car race some users may turn away from the action during recording, or may be tracking a particular car. Knowing what appears in the video, the system can pick out just those contributors who are looking at the race or even at particular participants in the race.

Thinking now about the problem faced by rights holders, it is possible to see how the same approach can be used to pick out potentially infringing content from that which is likely not. However, we can go a little further.

Clearly, we do not wish to encumber a rights holder with the task of reviewing every live stream that pops up in the location at a given time and checking it from infringement. While the techniques described so far would slim this list down, there is still the potential for a large number of streams to check.

When a rights holder wishes to declare an interest in an event, we need a way for them to be able to describe the parameters of this event beforehand.

This includes, of course, the ability to define a region within which the event will take place as well as time limits for its start and end. However it also includes the ability to provide a list of tags that can be used to match against content.

By defining collections of tags that content must, may, oughtn't and mustn't contain in order to be included in the rights holders event, it is possible to see how much of the review process may be automated.

Priority Using Metadata

Whenever a collection of data streams must be presented together, for example for moderation, review, recommendation, selection or otherwise, given the possibility that the numbers involved might be high, it is important to be able to order the list in a meaningful way.

One way in which data streams may be ordered is according to the standing or reputation of the creator. Data streams contributed by users with a good reputation may be shown towards the end of the list as they likely require least attention from the moderators. Content from new or less reliable contributors deserves closer attention and should be ranked higher.

Similarly, content with only a marginal chance of being a good match to a user's search should be shown below good quality matches.

In the same way, streams with a lower quality (resolution, frame rate etc. . . ) should be shown below those of a higher grade.

Generally, more relevant content ought to be seen more easily by the viewer whatever their use case.

By allocating a prioritisation to data streams in this way, timely access to data streams in the moderation queue is provided for those that are more likely to need attention. Better quality viewing streams are provided. This allows the tagging of data streams to be improved and better described/ annotated/tagged content gets more views.

Content that is moderated more quickly gets seen when fresher, getting the viewer closer to the real live moment.

Data streams may be prioritised in general whether or not they are also grouped. Where grouping is used, then prioritising methods may be provided within a group.

Figure 20:
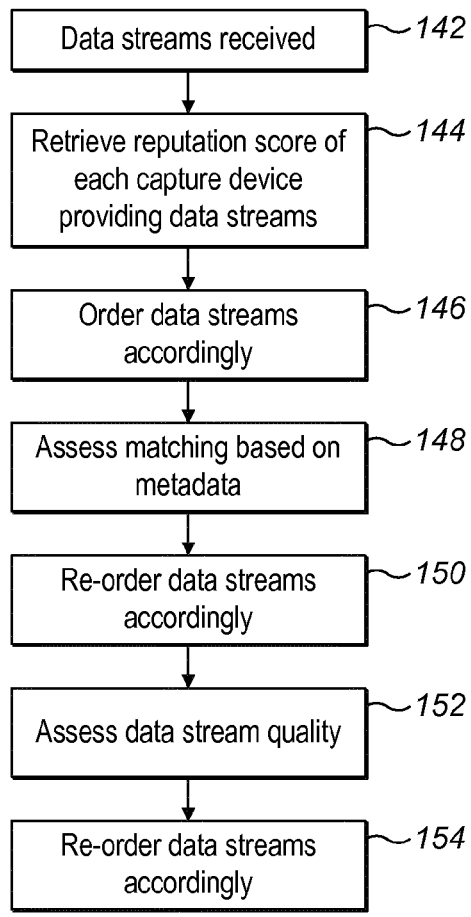
FIG. 20 illustrates an example related to prioritisation.

With reference to FIG. 20, there is illustrated an associated process.

In step 142 data streams are received by the server. In step 144 the reputation scores associated with each capture device providing the data streams are retrieved, and then in a step 146 the data streams are ordered accordingly, based on the reputation scores given.

In a step 148 the matching of the data streams to the groups is determined based on an assessment of metadata, and the data streams then appropriately reordered in step 150.

In a step 152 the quality of the data streams is assessed, and then in step 154 the data streams accordingly reordered.

Stream Display Order Prioritisation

Whenever a collection of content must be presented, consumed or processed together, whether for moderation, review, recommendation, selection or otherwise, given the possibility that the numbers involved might be high, it is important to be able to order the list in a meaningful way.

This may be advantageous so that processing resources (technical, human or otherwise) are expended on content deemed to have the highest priority first.

Prioritisation may be based on the metadata associated with the content. This metadata may include information about the originator, about the intended or actual audience of the content or the subject matter of the content itself.

The priority assigned to a given piece of content may not be a single value but may be a timeline of values that indicate the priority of the content at any moment throughout its duration.

The prioritisation technique depends on the prioritisation purpose. For example: a prioritisation scheme configured to prioritise content for encoding might order the content items by popularity in order to encode the most popular items soonest. In another example, a prioritisation scheme may be configured to order content by likelihood that it contains banned material so that questionable items may be moderated quicker.

The dynamic nature of the prioritisation is important. Prioritisation operates on a queue of content items being processed/consumed/presented/etc. . . . If that priority changes then the position in the queue changes. So content that had metadata that meant it was important to process soon (i.e. high priority) might change (e.g. the content creator may move the camera to something less interesting), causing its priority to fall.

Whenever a collection of streams must be presented together, whether for moderation, review, recommendation, selection or otherwise, given the possibility that the numbers involved might be high, it is important to be able to order the list in a meaningful way.

As has been discussed specifically for moderation, one way in which streams may be ordered is according to the standing or reputation of the creator. Streams contributed by users with a good reputation may be shown towards the end of the list as they likely require least attention from the moderators. Content from new or less reliable contributors deserves closer attention and should be ranked higher.

Similarly, content with only a marginal chance of being a good match to a user's search should be shown below good quality matches.

In the same way, streams with a lower quality (resolution, frame rate etc. . . ) should be shown below those of a higher grade.

Generally, more relevant content ought to be seen more easily by the viewer whatever their use case.

Timely access to streams in the moderation queue that and more likely to need attention is achieved.

Better quality streams, better described/annotated/tagged content gets more views is achieved.

Content that is moderated more quickly gets seen when fresher, getting the viewer closer to the real live moment.

Extra

Figure 23:
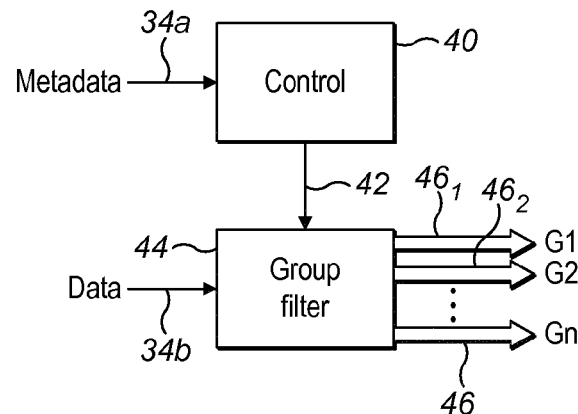
FIG. 23 illustrates an example relating to grouping.

With reference to FIG. 23, there is illustrated an example as to the operations performed at the server on receipt of the metadata and data. This example assumes that the metadata and data have been transmitted as shown in FIG. 2, but in general for the described operation the metadata associated with the data may have been generated in any way, and in particular the metadata may have been generated in the server 2.

As shown in FIG. 12, the metadata is input to a control block 40, and the data is input to a group filter block 44. The group filter block 44 receives a control signal on line 42 from the control block 40.

The control block 40 generates the control signal on line 42 to route the data on line 34 to one of a plurality of groups, denoted in this example by a firs group G1, a second group G2, and an nth group Gn. The control block 40 analyses the metadata for the data, and groups it according to rules.

Thus the data received on line 34b is output on line 461, 462 or 46n. The data may be output on one or more of the lines, and allocated to one or more group, in dependence on the control.

Figure 24:
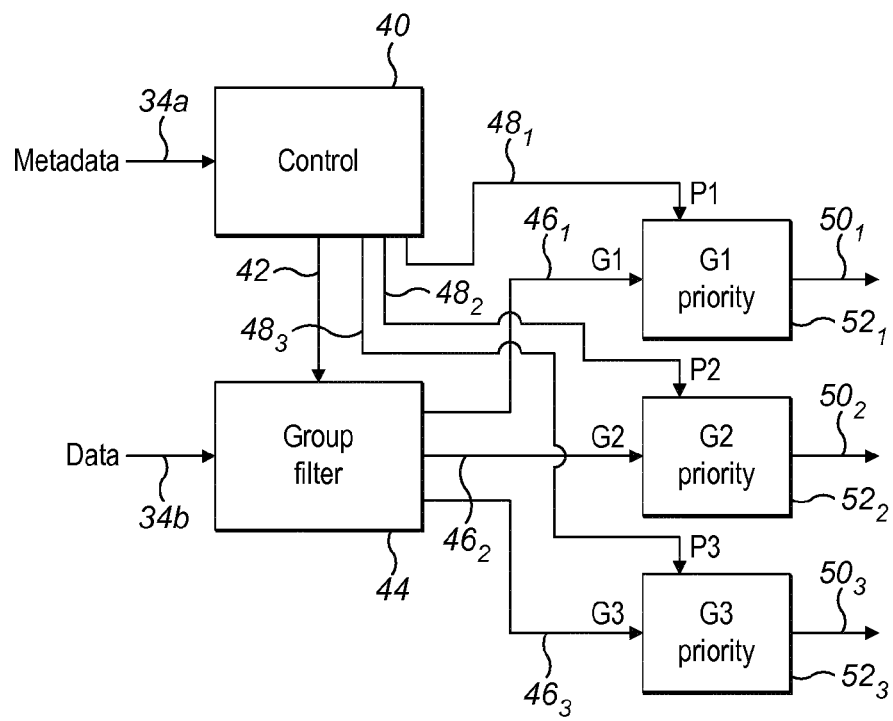
FIG. 24 illustrates an example relating to priority.

A further modification is shown in FIG. 24. In the example of FIG. 24 it is assumed that there are three groups G1, G2, G3.

Each of the data streams is allocated to one of the three groups based on the control signal on line 42. In addition, once grouped, a further control signal 48, and having component parts 481, 482, 483, each associated with tone of the groups, is generated.

Each of the control signals 481, 482, 483 is used in a priority block for each group, denoted by 521, 522, 523 respectively, to apply a priority to each signal within the group. Thus signals can be output for each group in dependence on the priority, which is also derived from the metadata for the data.

Figure 25:
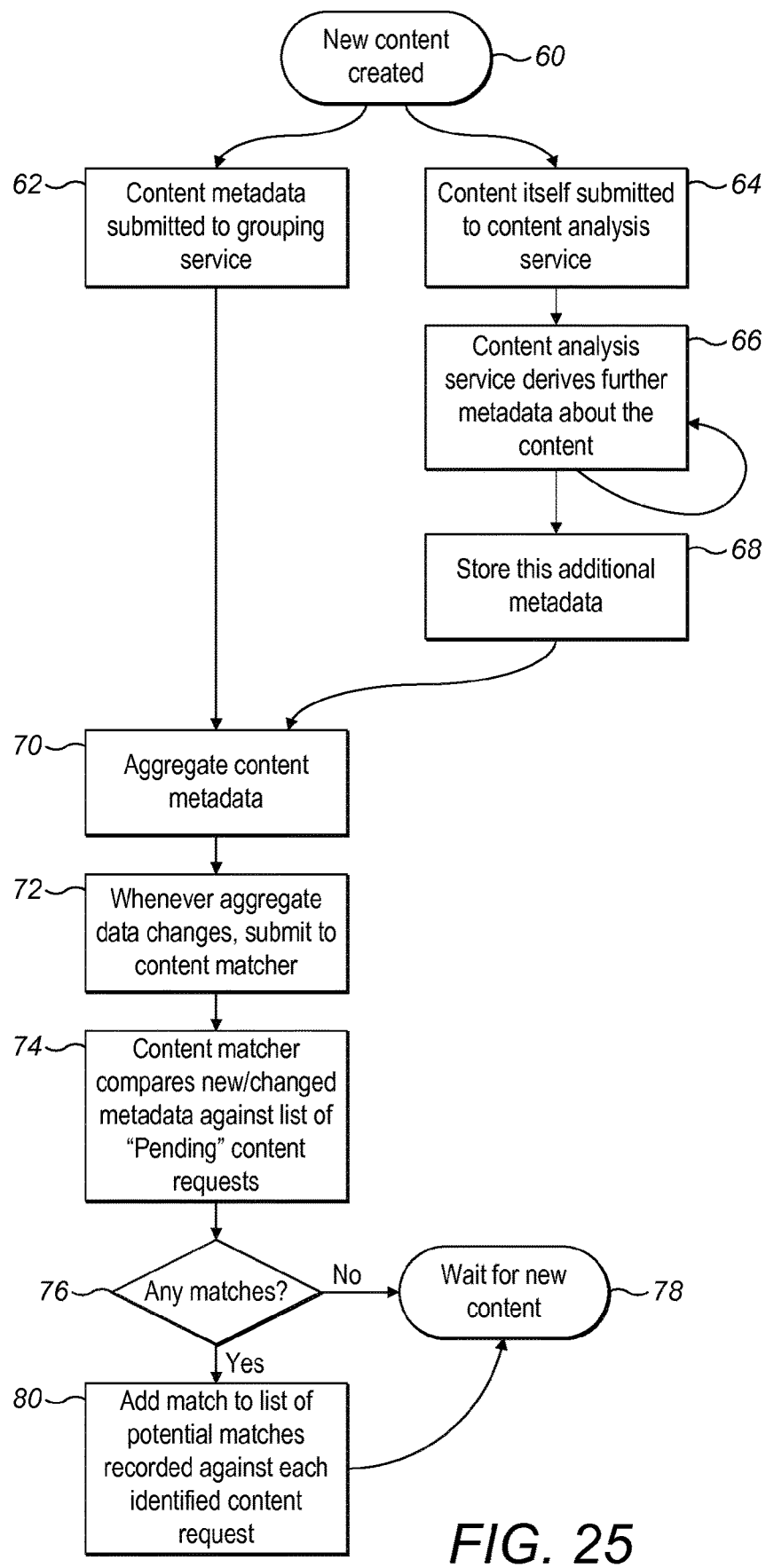
FIG. 25 illustrates an exemplary process for handling requests.

With reference to the FIG. 25 there is illustrated an exemplary process.

As the noted by step 60, a new content is created and received at the server 2. In a preferred example, the received content comprises data and associated metadata. In the described example, it is assumed that the metadata is transmitted to the server with the data itself, although in alternatives the metadata for the data may be generated within the server 2.

In step 62, the metadata for the content is submitted to a grouping service.

In step 64, the data itself is submitted to a content analysis service.

In step 66, the content analysis service analyses derives further metadata about the content itself. This step may be repeated several times as required.

In step 68 this additional metadata for the content is stored.

In step 70 the metadata for the content is aggregated. That is, the received metadata is aggregated together with the metadata generated by the content analysis service.

In step 72, whenever aggregate data changes, these changes are submitted to a content manager. The metadata is used in order to determine the matching up of content to a request, and therefore storing of any changes to aggregate data is important.

In step 74, a content matcher compares the new or changed metadata against the list of content requests which are pending.

In step 76, it is determined if any matches are identified. If no matches are identified, then in step 78 new content is awaited.

If a match is identified, then in step 80 the matches are added to a list of potential matches and recorded against each identified content request. The process then moves to step 78 to await further new content.

Content Driven Discovery

This relates to content finding users, rather than users going looking for content. This provides a solution to a problem of live content failing to find an audience while the content is still live.

Metadata is used about streams a viewer has watched to build up a profile of what that user may wish to watch in future. Further, metadata generated about a new stream, as it happens, may be used to match it to viewers who may be interested in watching it.

This feature allows content to go in search of viewers rather than assuming viewers will find it. This may be especially important for live content that may not last long, or may be from a new contributor. In these cases, it may be essential that content creators begin to see that their work is getting the best possible exposure so that they are encouraged to keep creating.

As viewers watch and engage with content, the system may maintain a list of characteristics that it thinks each viewer likes. It might do this by using the tags, descriptions, locations, or events a stream belongs to or specific metadata from moments at which a viewer taps their screen (e.g.) to say they like a stream. By whatever means, the system is able to track each user's tastes and preferences over time.

When a new stream begins and metadata about it becomes available, the system will match it to viewers who have liked similar things before. By sending a notification to those users to come and watch the new stream, an audience can be mustered for any stream. This means that the potential audience for a stream is not just the contributor's followers or friends, as might be the case with existing platforms, but indeed anyone who might enjoy it—whoever and wherever they are.

Topics/tags/themes/creators that are particularly interesting to a viewer can be followed. This gives the system an explicit signal to curate future content for the viewer that matches the topic/tag/theme, or which comes from a followed creator.

For a customer, for events that give rise to a large number of user-generated streams, this approach to discovery allows the customer to reach viewers and bring them to the content in a more meaningful, more personally relevant way. A viewer is not simply brought to the event's landing page but is, instead, brought to a stream that suits their tastes—potentially suiting their tastes exactly.

Being able to see the relevance of an event's content immediately in this way preferably encourages viewers to stay for longer and explore more of what is on offer For a contributor end user, there is provided a quicker and easier technique to build an audience. It does not depend on having streamed before. As soon as the system can categorise and/or tag and/or analyse the content, viewers can be found to watch it.

For a viewer end user, there is a more natural discovery process. It is harder to miss interesting content. It is easier to find entirely fresh material from all-new creators.

Invite Contributors

Users who have created videos containing particular types of content (as indicated by the metadata associated with those items of content) can be enumerated so that other users can invite the best creators to help them shoot new content.

With this technique, more particularly, users who have contributed to a particular type of event in the past, or who have built up a reputation for quality contributions on a given topic, may receive notifications to begin contributing new content to a new event if they are nearby or close to one of an event's points of interest.

This ties into a general concept of a content marketplace, in that content creators with a track record of capturing particular types of content may be invited to contribute to new events.

For a customer, this encourages organic growth of a group of users adding content of an event. By matching contributors with the content they have shown they are good at capturing, the overall quality of available material will improve. More contributors means likely more viewers, and a wider range of high quality submissions from which to choose material to feature or publish to a published stream. More users of all kinds involved with an event builds its profile and exposure to the wider public.

For a contributor end user, it is possible to create multi-camera content without creating a formal group of contributors first, drawing instead on those users who may wish to collaborate on an ad-hoc, casual basis. This creates a greater sense of community amongst content creators.

For a viewer end user, better quality content may be offered as a result of creators actively helping to improve/augment events with their own contributions.

Auto Geofence

Metadata may be used to group streams in a geographic area, and create a geofence around it. This is an example use-case of grouping but contains potentially further interesting details about how to detect outliers that improve the geographic grouping approach.

Having identified one event (by whatever means) around which it is possible to mark a geofence, future streams appearing within that area and which have some other commonality with past streams associated with other events within the area may be marked as potentially being part of a new event.

For example, at a football stadium a rights holder may create a geofence for a match and collect all streams originating within it. At a later date, a new stream starts up and part of its metadata indicates that it is of a football match. The system may speculatively create a new event with a geofence matching the previous one in order to catch more relevant streams more quickly and therefore provide better coverage of the whole event.

There are certain locations in which people often gather together for one kind of event or other. This includes stadia, conference centres, transport hubs, shopping malls, festival areas and so on.

Past events, having been identified, can be used to improve the speed with which future ones are detected. This may not allow the system to work out the type of event (e.g. the difference between a football match on one day and a music concert on another day at the same stadium), but the ability to mark streams as likely belonging to an event sooner rather than later may ensure that more streams get correctly identified and included sooner.

For a customer, streams belonging to the event, identified sooner, means that the customer gets to start showcasing their event to viewers quicker. Early streams that might otherwise have been missed or excluded from the event will now be more likely to get correctly identified and tagged, meaning that the customer's event pages—for example their event pages in a content delivery application—carry a more complete picture of the event.

For a contributor end user content is not overlooked that should be featured in an event owner's content pages. It is possible for a contributor to get more viewers for their content when it becomes included within an event owner's pages. There is also more chance of kudos for a contributor at being featured by the event owner.

For a viewer end user, there are fewer missed moments from an event.

Automated Interactivity

Watching video, even spontaneous live video, can often be a passive activity. However in some cases it is desirable or preferable to engage with an audience more directly through timely elements of interactivity. These engagement opportunities might appear during particular moments of content that a publishers wants to get feedback on (voting, rating, scoring etc. . . ); a measure of overall level of engagement amongst the audience might be important etc.

Such interactivity is possible on a traditional television broadcast but comes with an overhead to manage, time, collate, report, and filter interactive elements.

It is therefore proposed to provide a modification to automate this. A number of possible techniques are envisaged:

Firstly, an example is to provide voice recognition that allows the system to process the spoken word and pick out key phrases or structure that can be automatically converted into instant interactions. For example, hearing "What do you think of X?" might be converted into a pop-up on a viewer's screen with the text and a text entry box for submissions.

Secondly, an example is to pre-configure swipe/gestures to insert particular interactions at certain moments.

Thirdly, an example is to provide image/shape recognition so that whenever the camera sees, e.g., a can of a particular drink in the image, it shows viewers an overlay that they can tap to get a scannable QR code to redeem a can at a discount.

Use cases for this modification include: TV; level of engagement; donations (see later); or PPV.

To a customer, a value is added with an option to measure the level of engagement of the viewing audience which can be used to price advertisement spots, shape future creative decisions etc. Deeper analytical information about the audience is made available. Audiences are kept engaged for longer—rich, rewarding interactions will stop the attention of a viewer straying elsewhere.

For a contributor end user, a cameraman can spend more time shooting the content and less time curating interactions, and yet still be able to rely on the system to produce meaningful interactions that will generate revenue/intelligence/engagement.

For a viewer end user, interaction—particularly with a live event—creates a more intimate experience of the content. Done well, it makes viewers feel more connected to the event and more likely to want to repeat it.

Event Montage

The metadata created for a stream can be used in an auto-zeitgeist/content summarisation process. The method may also be used in combination with creating an event montage. An event montage may include stitching video streams together to make a panoramic series of shots, or sequencing parts of contributing streams in order to, for example, follow a particular car/horse in a race; focus on one or more individuals in attendance; pick out clips that are about a particular aspect of the event and so on.

In this way, an event montage is effectively a condensed or summarised version of the whole or multiple captured video streams. It may also offer the additional flexibility of having access to overlapping pieces of captured video streams from which to choose.

The creation of an event montage may become accessible by generating metadata at the capture device and by providing metadata on a scene level. Further metadata may be generated or added to provide the system with information on multiple captured video streams of the same event and to create different event montages of the same event for the ability of the viewer to choose between alternative camera angles of any given moment. The method may add a new dimension for viewing streams that enables the viewers to engage and that gets the viewers interacting with the system more often.

It may offer a greater playback flexibility for the viewer who can watch during or after an event and see the whole thing. Viewers can capture an event themselves and in combination with different captured video streams from the same event, the viewer can collect footage he never shot himself but which shows him in attendance at the event.

The viewer may be able to dig into a moment and see it from every angle no matter who contributed the captured video streams.

During or after an event (if content is stored for later playback) viewers may ask the system to create a montage of streams from the event that tell a coherent story of it—a so-called event montage.

While watching a montage, a viewer may pause and ask the system to show alternative camera angles of any given moment.

For customers, this adds a new dimension to content that will engage viewers and get them interacting with the service more often.

For end user viewers, greater playback flexibility is provided—a viewer can watch during or after an event and see the whole thing. This is great for reviewing what the last event was like if you are thinking of going to the next one. A viewer can track themselves at an event, and/or collect footage they did not shoot themselves but which shows them in attendance at the show. This provides an ability to dig into a moment and see it from every angle no matter who shot it.

Protecting Rights Holders

Rights to content originating from certain public events such as sports matches, tournaments, music concerts and festivals, amongst others, are typically held by broadcasters, publishers and other similar organisations.

The proliferation of live-streaming applications on consumer devices however has made it increasingly easy for people to capture and distribute content that impinges on these rights. While some users do this unwittingly given the simplicity, convenience and fun of doing so, others do so maliciously.

Whatever the intention, these streams will necessarily dilute the rights holders' own output and may even damage the brand of the publisher or of the event itself.

Inappropriate content, poor quality recordings, content that shows talent unfavourably or that reveals part or parts of the event not intended for public consumption would preferably be blocked.

On the other hand, high quality content that conveys the intended and/or positive aspect of the event would be extremely valuable to the rights holder. As such, the distribution of this kind of user-generated content ought to be permitted if it can be suitably branded and optionally wrapped with a sponsor or other advertising material before it reaches the Internet.

It is this use-case, amongst others, that an architecture such as FIG. 1 can fulfil.

A first class of problem associated with rights holder content can be summarised as: how can the system, when being used by a consumer to capture content, identify this content as potentially infringing on someone's rights?

Having identified these streams, they need to be routed to the rights holder for them to decide whether a given stream should be blocked or should form part of their approved and branded user generated content (UGC).

Clearly with popular events or events that take place over a long period of time, it would be impractical to require the rights holder to process these approvals manually. Not only would this impose a significant resource overhead on the rights holder, but it would take so long to moderate the queue that the content would no longer be live or fresh.

A second class of problem is therefore: how can each new stream be moderated automatically? What parameters might a rights holder wish to specify in order to define a stream as acceptable or not?

Of course, users are not required to use an application associated with the server 2 to capture live content, and they may use a different platform that does not check for potential rights infringements.

In these cases, it would be beneficial if the rights holder had some way of determining whether a suspect live stream, recording or clip originated from an approved stream or not. Unapproved streams can be flagged as infringing and a take-down request issued.

Watermarking a stream would provide a useful means of checking whether it is approved or not. However, such a method would need to be computationally lightweight so that it could be inserted by the handset (e.g. phone) itself, so that there is no requirement for any significant back-end processing to add it.

Making the watermark difficult to remove is not as important as making it difficult to fake. A malicious user capable of identifying a watermark on a genuine stream should not be able to transpose this to an unapproved one. A visible watermark, while a useful marketing tool, would therefore not be sufficient.

A third class of problem is then: how can we identify content originating from outside the system as being potentially infringing? Further, can we create a watermarking system that is lightweight enough to be performed by, e.g., a smart phone, but computationally complex enough that it is difficult to fake so that, by checking for a watermark, potentially infringing external streams can be validated?

It may appear trivial that any external stream identified as potentially infringing a set of rights that must be policed is, by definition, unapproved and therefore infringing. However, this is not the case. Clips shared to social media, re-syndicated content, content captured from a curated stream etc. may all originate from approved content and yet appear to be external.

Protecting Rights Holders (Detail)

As described above, rights holders have particular problems with user generated live content.

Not only must they protect the brand they represent by ensuring that only good quality video content of the event is available to viewers, but they must also be able to satisfy themselves that their own direct offerings are neither diluted, undermined nor contradicted by user generated content that may make it out onto the internet.

There are enough ways for users to acquire, distribute and redistribute video content on the internet to make the volume of possibly infringing content vast.

For example: a user might create a stream using the Meerkat or Periscope applications at an event; a user might stream a TV image of an event; a user might clip a video from YouTube or Snapchat; a user might record a moment on Instagram and post to Facebook or add a video on Twitter.

Each of these outlets—and there are many more—may provide the rights holder with many video clips which they suspect may infringe their rights.

There is no practical way that a rights holder can arrange for each of these suspect videos to be checked manually. There may be hundreds of streams that the rights holder has approved, of varying lengths, and a suspect clip may originate from any of them. Moreover, the clip may have been taken from a video some time earlier, making the task of finding the original source, and validating it as an approved clip, even more difficult.

The problem therefore is: how can a rights holder automatically examine a collection of videos, from whatever sources, and determine which, if any, were taken from or represent approved streams and which do not so that appropriate action can be taken against them?

A solution to this problem is now described.

Each stream is provided with a hidden watermark embedded within it. This watermark encodes information that identifies the device on which it was captured; the owner of the device; and a moment-by-moment reflection of the time at which the content was captured.

When these streams are moderated by the rights holder of an event, three actions can be taken. The rights holder may accept that the content is of their event and approve it. The rights holder may accept that it is part of their event and reject it. The rights holder may indicate that it does not belong to their event at all. The watermark details of approved and rejected streams are added to approved/rejected lists for that event. These lists therefore describe which devices, which users and between which times content was approved or rejected for any given event.

Streams that the rights holder did not consider were part of their event are allowed—for example, the location of a stream indicated that it might be part of the event, but in fact it was not.

In this way, a system may be constructed which receives suspect videos, of any duration and from whatever source—for example, clips shared on Facebook, streams republished on other platforms, downloadable videos on file sharing sites etc.—such that they may be checked for the presence of a watermark.

Where a watermark is discovered, the device, user and timestamp are decoded for each moment and checked against the complete list of event approval and rejection lists for all rights holders.

Suspect videos that pass this test can therefore be shown to have originated from an approved stream and no action needs to be taken. Similarly, a watermark found in neither set of lists likewise passes the test since it did not fall within any known rights holders' events.

Content with no watermark is more difficult to process. Additional metadata about the stream needs to be considered if it is available.

Social media posts often carry geolocation data about where an update originated. This can be used by the system to see if the video may have been created (e.g. through Facebook, Twitter, Instagram etc in a location that fell within the spatial and time boundaries of a rights holder's event. If it did, then the suspect video is passed through any automated moderation process defined for that event in order to improve the level of confidence in the assessment.

At this point, if the video is felt to have originated from a protected event, a take-down notice may be issued to the publisher since any approved content must have a watermark which appears in the approved list.

This system can therefore consume any seemingly live stream, a delayed stream, a video-on-demand (VOD) clip, or a VOD asset, analyse it and determine whether it was itself or is part of an approved stream.

A separate problem occurs with users who create streams that cover an entire event. For example: someone who broadcasts his point of view for the whole football match; someone who streams the full set of songs from a band's performance at a concert.

Users who engage in this are typically less concerned with sharing an interesting moment, than providing viewers will an unofficial route into premium content.

While a rights holder may have approved the content from such contributors because it falls within their quality and acceptability criteria, a further refinement would allow them to bring streams to a close that last longer than a preset duration.

Contributors falling into this category can start another stream, but they should be locked out of doing so for a period if their location suggests they are still at the event.

This allows the body of user generated content to be populated with genuinely interesting vignettes, samples of life, rather than bulk uploads of the entire event.

There are other examples where the rights holder may exert some control over how content is captured at their events. This particular example looks at limiting the duration of such a stream, but the rights holder may also request the contributor to switch to a higher bit-rate/quality or similar for example.

The other issue discussed as a problem is screen-capture streaming. This involves someone using their capture device to stream something that is shown on a traditional television. Currently, this is the biggest problem experienced by rights holders and live-streaming applications.

There are two possible approaches here.

Firstly, the live streaming applications running on the capture devices may include software that is able to detect the presence of a TV screen in the image.

This is achieved by monitoring the captured video, locally on the capture device itself, and using known algorithms to detect the presence of rectangular features in the field of view.

This detection can be limited to rectangles with a particular aspect ratio (such as 4:3 and 16:9) so that rectangles similarly shaped to TV screens may be picked out. Algorithms can be chosen which are able to detect rectangles irrespective of their orientation with respect to the viewer, so a rectangle seen side on would be detected as readily as one seen face on.

Figure 21:
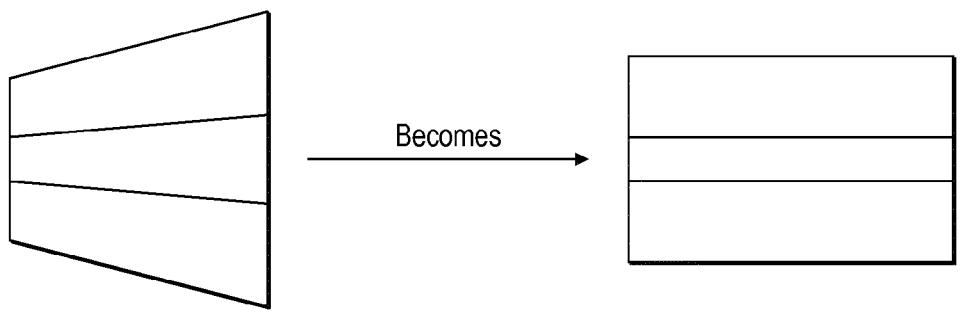
FIGS. 21 and 22 illustrate examples.

For each identified rectangle, the capture device transforms the contents so that they are mapped to a proper rectangle thereby eliminating any skewing or other deformation arising from the orientation of the TV to the viewer. The result is a rectangle of the given aspect ratio filled with the transformed content from the field of view, as shown in FIG. 21.

These one or more transformed parts of the captured video may then be further analysed to determine if they do indeed contain TV-style video. Contents tracked from one captured frame to the next allows a "video stream" for each suspected TV to be constructed from which a video fingerprint can be calculated and submitted to a server. The server may use this fingerprint to determine if the rectangle does indeed contain a TV signal and, if so, whether it is acceptable to retransmit this as part of another stream. If not, it may instruct the capture device to blank it out, as shown in FIG. 22.

Figure 22:
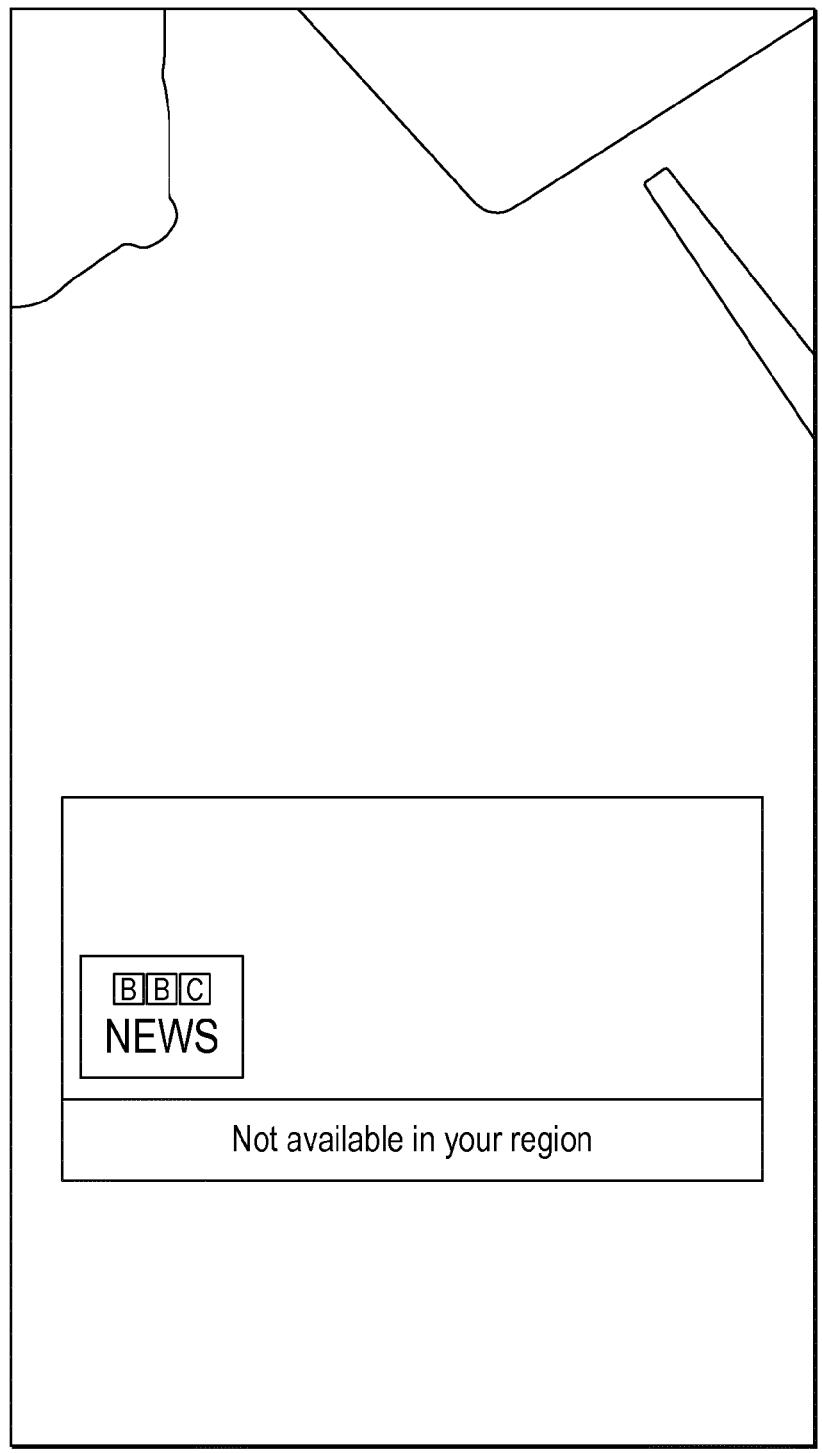

In FIG. 22, it can be seen that the BBC News channel has been detected within the capture stream and the server has instructed the capture device to edit it out. This blanking out would be achieved by the capture device so that no stream it produced and provides to the live streaming server contains any protected content.

Viewers, seeing this, may be further offered the option to pay for access to the protected part of the video, whereupon they would be taken to an approved source of the content, or offered direct access to free-to-air but approved versions instead.

This approach depends on having detection software in the capture device itself - such a solution may be beneficial to existing live streaming platforms wishing to proactively prevent their users abusing rights holders content.

A second approach uses a similar detection process but analyses streams that are already being published.

Such an approach might be used by a rights holder to monitor content found on the internet and pick out those streams, on-demand assets or clips which feature TV footage of their content.

Video Challenge

Video challenge depends upon grouping streams by similarity.

In summary, a collection of media assets, whether live streams, pre-recorded or otherwise, or any part of either, or any combination thereof, grouped in dependence on one or more items of common metadata may be provided to a function by which these assets are rated in comparison to each other.

For the avoidance of doubt, a media asset is an item of content.

Common metadata here is taken to mean there is a non-trivial intersection between the sets of metadata associated with each stream.

The rating function may be a computer program that evaluates the assets or the assets in combination with their associated metadata in order to determine a relative ranking from which a comparative rating may be derived.

The rating function may be a system that presents the assets to one or more users for them to provide comparative ratings.

When presenting assets to a user, the system may present all assets at once so the user can provide comparative ratings to each asset while having visibility of all the others.

Alternatively, the system may present two assets from the collection and prompt the user to choose the asset they would rate lowest. The lowest asset is then replaced, in the user's display, with another asset from the collection. The user is then prompted to repeat the rating process.

Having discovered a collection of possible streams to watch, perhaps grouped by theme for example, a viewer may be presented with two streams playing side by side. At any moment, the viewer may choose to dismiss one as less interesting than the other. Its place is then taken by the next live stream in the list.

In this way, the viewer is exposed to more content than they would otherwise be; contributors get exposure to a wider audience; good content rises to the top along with their creators' reputation; and the system learns more about what a given viewer does and does not like.

A customer may wish to push the best content to their published stream. While it may be difficult to sort through this content manually, this video challenge feature adds a degree of crowd-sourced quality checking to what may be a vast number of streams. This can be used, along with prioritisation techniques described here elsewhere, to sort the list of possible streams and allow the customer to more easily pick out the streams they wish to feature A greater understanding of the audience is provided, and the ability to improve the quality of future recommendations is provided.

For the contributor end user, content gets exposure to a wider audience with greater opportunities to receive and act on feedback from those viewers. Better exposure increases the incentive to create more content. More timely feedback allows the contributor to truly respond to the desires of their audience and create a genuinely bi-directional experience. This helps build an audience beyond a contributors followers and friends.

For the viewer end user, there is provided a more engaging content discovery process allowing the viewer to drill down to that perfect live moment with minimal effort.

Content Marketplace

Requests for content, or "calls", might be requests to film specific people or event, but they are not necessarily be limited to requests to film specific people. They could be requests to:
1. Film a clip of the sunset over the pyramids while looking out of town, so there is only the desert and the pyramids.
2. Film a "how-to" clip that shows how to correctly hang a painting.
3. Film a shopping trip to Macy's.

The "put" might be fulfilled automatically by the system when it sees a stream that happens to match the requirements, or it may be fulfilled explicitly by someone picking up the order and posting a scheduled event that will feature the requested content.

Users can up or down vote each other based on whether the live stream matched what they asked for or not.

Finding content to watch in a live-streaming environment can be challenging. Indeed, this description includes several concepts seeking to address various aspects of a discovery process for ephemeral content, such as ad-hoc live streaming, which presents unique difficulties.

In this discussion the concept is turned on its head, to address the problem by allowing viewers to request the creation of content. Thus a content marketplace is created.

When searching for content or compiling a playlist of live and near-live streams, not every request can be fulfilled successfully. Some themes, terms or combination of criteria may not yield any results at all; others may exist but be out of date or not be a sufficiently close match.

Traditionally, these details of these failed searches and fulfilment requests have simply been ditched. However, it seems foolish to discard such valuable intelligence about what the audience actually wants to see on the platform.

The problem therefore is: how can we use viewers' search and fulfilment requests to drive content generation throughout the platform as a whole?

As part of the discovery function, the viewer may describe the content they are looking for using free-text which in turn is broken down semantically, by the system, into a series of key words and phrases.

These tags are used to search the current collection of live streams for matches that might fulfil the viewer's needs. Live content is similarly tagged, in real time, to describe what's going on in the video using an automated process that analyses both the video and audio aspects of the material—this process is covered elsewhere.

If no good quality matches are found, or if the viewer does not quite see what they want, they may use these tags to create a request for new content. A viewer may also skip straight to this request stage if desired.

Such a request contains at least a list of tags that describe the required content but may also include a message with more detailed requirements; a deadline for content and notes on intended usage. The requester may also offer a fee, or request particular sets of reuse rights. Likewise, they may describe, using tags, things which should not appear in the content.

Requests, or "calls" for content, to borrow a financial trading term, are entered into an online catalogue that other users may browse. This catalogue is indexed and categorised based on the tags, fees, rights requested and so on.

Requests may be fulfilled in one of two ways.

A contributing user may claim a request by offering to provide the live stream as described. During the stream, the system performs its usual audio-visual (AV) analysis of the content and checks off those tags which should or should not appear in the stream.

This contributor may also, by arrangement with the requester, submit pre-recorded content in cases where a request cannot be fulfilled at a time that is convenient for the requester to watch live (e.g. 'I'm in London but want a video of the Sydney Opera House at daybreak').

Requesters may accept or reject a particular submission. Rejections mean that the request stays open for another user to attempt to fulfil it, but also that any rights remain with the contributor.

The second fulfilment method is an automatic one. As other users engage with the platform, the AV analysis may, from time-to-time, match a stream with a requester's needs. These unintentional matches are made available to the requester to review, either as they happen or later.

If the requester believes a stream meets their requirements, they can mark the request as fulfilled or, where a payment or rights are required, the same terms are offered to the contributor who may accept or reject them closing or leaving the request open respectively.

So, rather than this being a marketplace of sellers, this is a market of buyers looking for contributors to create suitably crafted output.

Requesters may similarly create an open request for content that alerts them any time interesting content becomes available. This feature, while using much of the same logic, delivers more of an active search function that allows content to find viewers in real time.

This last point is worth emphasis.

When dealing with live content where contributors may be broadcasting for only a short time and where they lack the time or convenience to describe accurately what they are filming, passive discovery is unlikely to be successful.

The chances of a viewer being on the system and searching for something at the same moment as a contributor lights up their camera and broadcasts is slim.

What is better is to allow viewers to articulate their needs (or deduce them), and let the system actively monitor for suitable content and bring the user to the app as it finds matches.

Leaving aside the purchasing/rights marketplace feature for a moment, the exchange-like function the system provides by matching requesters with contributors where their needs and output overlap is considered.

As has been described above, requests, or active searches, may be matched explicitly by contributors seeking to fulfil the request, or casually by contributed streams that happen to match.

In reviewing the content, howsoever received, the viewer may up or down vote the stream based on how well they perceive the content matches the search. These votes affect that contributor's standing or reputation score as a provider of material categorised in each of the tags present.

These scores affect direct contributors and casual match contributors differently. A direct contributor's standing will be affected on all tags that were meant or not meant to appear in the content while a casual contributor's standing is only affected for tags that do actually appear in their content and the request.

Reputation scores backed by a body of work will be vital for contributors hoping to engage with paid-for requests. The marketplace concept can now be returned to.

One way in which live content has become increasingly valuable, though it is perishable still, is with traditional broadcasters looking for exclusive footage of events. News, sports, cultural, music, demonstrations, etc. are all situations from which broadcasters have a need to source content. This can be expensive to do using in-house resources, but cost-effective by crowd-sourcing it.

The content delivery technique described herein, with its content marketplace, is able to fulfil those needs. As mentioned above, requesters may configure active searches/requests for content and wait for user-generated content to be matched.

Users willing to enter into transactions that allow their content to be sold can find their streams being picked up as they happen by, e.g., news organisations or similar and fed directly to websites and TV stations as events unfold.

This automated matching of required tags in a search with a broadcaster's needs, together with the ability to specify a reputation threshold that a matched contributor must meet or exceed, allows the organisation to source high quality exclusive content at a fraction of the cost of traditional outside broadcast facilities.

In a supplemental aspect, a rights holder may offer a bounty to members of the public in exchange for capturing content of a poorly covered part of their event using live statistics.

Paywall

A paywall provides for automated pricing based on metadata. An extended ability to generate and process metadata at a capture device may also be used to offer more opportunities to monetise captured video streams.

Beyond the possibility of advertising added in and around live streams, there are currently very few monetisation opportunities with so-called user generated live content. In part, this is due to the perceived low quality of much of the output or, where quality is assured, an uncertainty about how the audience will eventually come to value the medium. Only few platforms and systems offer professional producers meaningful tools for generating revenue from their output.

The described method and system may address that gap, by the ability to generate and provide metadata also in consideration of the monetisation process that the system provider intends to accomplish.

System providers or publishers of the content wishing to monetize the viewing streams may configure open-access periods during their broadcasts (e.g. the first 2 minutes are free to all; certain subsequent portions are open; etc. . . . ), while setting premiums on the remainder. Viewers may gain access to the content on a pay-per-view basis or via a subscriptions. Metadata that allows for the distinction can be used to control the access.

A monetization process may also allow a subscription to a particular content creator's output, or to a cross-contributor selection organised by theme. For example: a subscription to 'cat videos' would provide access to any premium cat video output from any participating contributors amongst whom proceeds would be distributed based on viewing figures. Metadata that are generated at the capture device may be used to support the organization into such themes as well as to consider contributors when allowing access to viewing streams.

Where a user of a capture device allows its captured video streams to be viewed on demand, similar rules may apply with some archival videos being offered for free, while others carry a premium.

As above, a subscription method that involves a matching of criteria to which viewers have access with metadata of captured video streams may support a dedicated offering mechanism, and with such a method contributors may control to whom their premium content is offered. Beyond traditional restriction options such as location, device-type and age, contributors may consequently also limit access of the captured video streams by user group.

For example, a university offers a range of online courses where participants may watch lectures live using the described system. The university does not wish to encourage full-time students to skip attendance and so limits the availability accordingly.

Contributors may control to whom their premium content is offered. Beyond traditional restriction options such as location, device-type and age, contributors may also limit access by user-group. For example, a university offers a range of online courses where participants may watch lectures live using the described content delivery system. The university does not wish to encourage full-time students to skip attendance and so limits the availability accordingly.

A similar example can be understood for streams arising from a music festival where organisers wish to allow those not attending to watch, but do not wish to stymy the flow of attendees from one performance area to another.

Conversely, contributors may offer their content for sale directly thereby operating a market for requests for content and submissions against the same.

Contributors may set thresholds for the sale of their content to broadcasters who may create automatic bidding rules for particular categories of content (akin to the ad market Google operates with AdWords)

Donations

Donations allow a publisher to solicit donations from viewers as an alternative or supplemental revenue stream.

Church or voluntary groups, charities, schools etc. may create content that includes a fundraising drive. Donation buttons that launch a simple payment process can be placed over the live stream throughout an event or, by using a director/ or pro-publisher application, placed on screen manually at key moments or even automatically in response to certain phrases being said by the speaker.

To a customer, additional revenue stream is provided without the hassle of having to create a donation funnel—a one-tap configuration sets up the donation option.

To an end user, a more palatable alternative to advertising is provided, and the ability to donate to a cause without needing to switch to another application and losing track of what is going on in the event.

Live Statistics

Live statistics uses metadata that describes what happens in a section of content to create performance metrics. The system and described method may also be used to increase the quality and the usage of statistics of content consumption. Metadata that is generated at the capture device may provide considerable information on the captured video stream without increasing the load at the server side to an unaffordable level. Metadata on scene level may be used to infer statistics about how the viewers of the viewing streams engaged with the video stream far beyond pure information, e.g. about how many viewers consumed the stream or for how long had a viewer watched a viewing stream.

An aspect of the method may include a matching of the period and corresponding time stamp to which a viewer watched a viewing stream with the associated metadata within the time stamp of the video.

The method may include the generation of metadata which allows for separating the captured video stream into chapters of different topics. E.g. the generation of metadata for a captured video stream recoding a public political debate can be used to find and provide headlines of topics of what the debate is about. Consequently the metadata of the captured video stream representing a clear correlation between time stamp and topic may be compared to statistics of a viewer's consumption behavior. Further interpretation of what viewers find interesting—and what not—can be accomplished.

This may also be used in an aspect in which the live streams are captured and metadata is generated in parallel to the stream. Real-time analysis of the viewer's consumption behavior in consideration of the generated metadata during a speech may be accomplished to provide real-time feedback of the viewer's behavior to the speaker with regards to what the speaker talked about.

Statistics, or better analytics, are applicable to many questions and aspects of a video event and in particular to live events. In the following description real-time analytics or real time stats are discussed, meaning when particular selected measures are shown to, e.g., a speaker in real-time during a speech.

As a consequence of this, this discussion is about anything that becomes value, as it is fed back directly during the speech. This discussion is not about analytics and statistics which conclusion is good being analyzed later on, e.g. for any improvement for the next event (i.e. historical statistics).

In addition this discussion is about statistics for which statements are clear and recognizable immediately, as the speaker has not the possibility to "analyze the analytics" during his speech, not to react on aspects that need complex consideration to find a correct meaning related to the current speech.

Lastly this discussion is about relevance and not about quality. Relevance means that the real-time statistics should help to answer very simple and clear questions from the user of the statistics (i.e. the speaker), so that it can help the speaker to react immediately.

This might split it into two possible use cases.

In a first use case, there might be very few questions that are clearly relevant for almost any kind of events where real-time statistics could help. That is, for instance, how many users are online and perhaps more importantly what is the current variation?

Such information can be displayed clearly and easily. It can indicate for instance at a start of an event that viewers slowly log into the event and start looking. There might be also some typical variation on the number of viewers due to a certain percentage that just enters a web page but leave it again after some seconds.

But the real variation is much more valuable as it could indicate that the audience is reacting on the event in particular and not as a "standard behavior" of a typical live stream viewer on the internet. It could, e.g., show that the sermon of a priest is really appealing indicated by a longer positive value on the variation, and vice versa a boring or even displeasing sermon would most likely lead to a longer negative value of the variation.

The issue here is that the live statistics are used to answer particular questions and show the answer in the easiest depicted way to illustrate the statement fast and clear.

Moreover, while the number of viewers may remain steady there may still be a degree of churn with as many new users joining as old users leaving. Providing an indication of this would give the speaker valuable insight into the "stickiness" of his audience.

In a second use case there might be also questions that are relevant for a specific type of event or a specific event within a series. Having said that a speaker might want to "prepare" his real-time feedback screen to get the immediate feedback on such a concrete question during that individual speech.

For instance someone plans to preach about a theme that is in particular interesting for a certain portion of his audience and he would like to know in real-time whether he gets encouragement or perhaps refusal.

Anyway, the issue this addresses is something that needs a certain filtering, election or perhaps processing of the actual real-time data that the system gathers and can provide.

Think about an example of talking about euthanasia in a religious manner. That is definitely something that could create strong emotions from a certain portion of the viewer, i.e. older people.

So showing the current variation of viewers that log in and out would rather overlay the answer to that question as apparently it would just indicate the audiences' interest in general, rather than the feedback from the perhaps most emotionally reacting portion of the audience.

So the focussing of the variation of that portion would be more relevant for the question how much refusal the priest will meet or whether he gets encouragement on his statements.

A further opportunity turns the live analytics question around somewhat. Thinking not about the user capturing the content but about a rights holder to whom a collection of streams has been assigned by whatever means.

Such an organisation may wish to see, in real time, how their event is being covered by members of the public. Imagine a race track (horses, cars, etc. . . ) or a golf course. Action may be concentrated in particular areas but there may, at times, be places where something unexpected is developing but which is not being covered.

Rights holders, in these cases, may decide to offer a "bounty" to contributors who help bring in additional coverage of a part of their event.

Real-time analytics, presented in a simple way that seek to answer well defined questions (such as the level of coverage an event currently enjoys across its extent) would be of value to rights holders and event managers alike.

The description of the real-time statistics shows that a solution for that idea needs in a first instance real-time data. For example, the number of viewers and particulars of current viewers is one good example.

To ensure the relevance aspect, the speaker should be able to input his current interest i.e. his question that he wants to get feedback during the speech. That means in a standard solution a pull-down menu of accessible real-time feedback could be used to let the speaker decide what to get. In the discussed example "the real-time variation of the audience".

In a more sophisticated solution a question could be also selected by a matrix of questions and subcategories for which data points are accessible. In the discussed example it would need, for instance, the age of the viewer gathered from profiles of the subscribed audience. A subcategory would be then "with the age of 60 and above".

Finally an easy and/or clear depiction of the answer is mandatory. In the discussed examples there may be a permanently moving bar indicating whether there is an increase (green) or decrease (red). Or alternatively a pie that is getting smaller or greater whereas the pie itself indicates the total number of viewer and the dynamic in size and color (again green for a growing number and red for a shrinking number) shows the variation.

One can think further to provide easy little maps—for example four smileys that represents certain portion of the audience (age under 20; 20-40; 40-60; and >60), and the size and color shows again variation and total number of the respective group. In addition the smiley's facial expression indicates a third information which is gathered by an additional data beacon.

The real point is that in dependence of the accessible data points, there are some predefined information usable to give relevant feedback to a speaker during his speech, but also with more data points multiple combinations come up that could help to answer more sophisticated questions in real-time.

Figure 26:
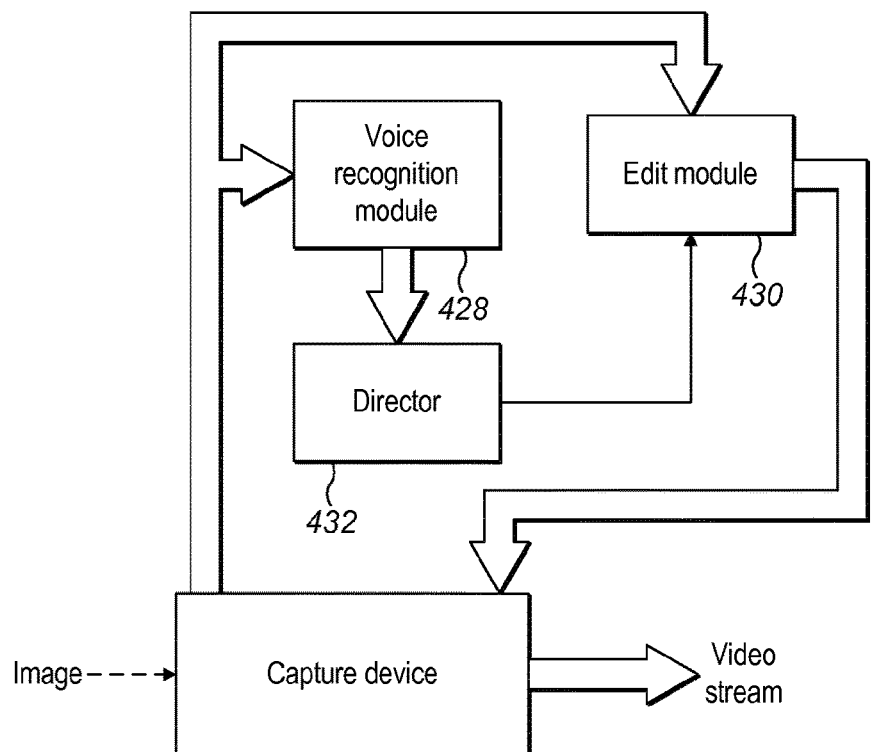
FIGS. 26 and 27 illustrate the exemplary augmentation of data.
Figure 27:
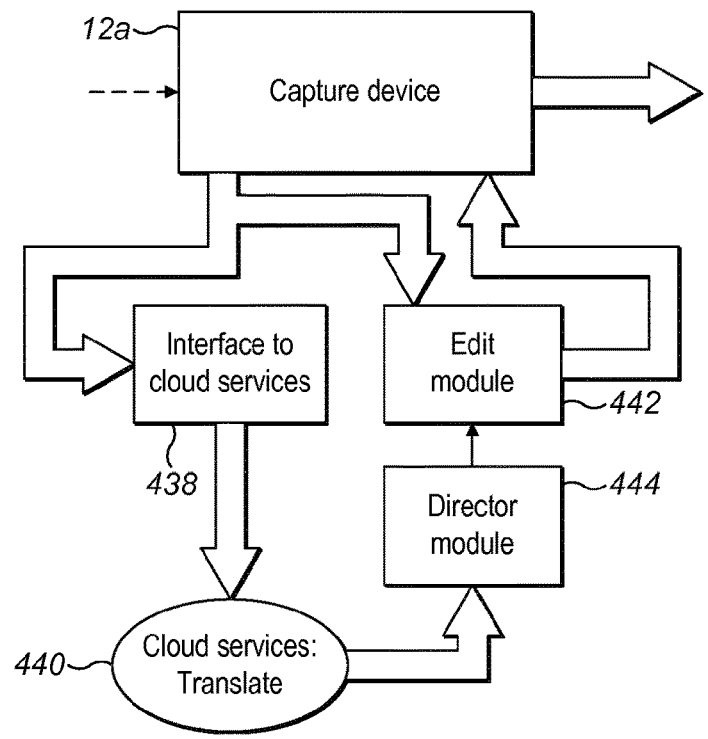

With reference to FIGS. 26 and 27 there is further illustrated examples in relation to augmenting data.

As illustrated in FIG. 26, a capture device 12*a* is connected to a voice recognition module 428, an edit module 430, and a so-called director 432.

A set of captured images may be provided by the capture device 12*a* to the voice recognition module 428, in order to edit the video stream associated with the captured images. A video stream may then be transmitted, for example to the video streaming server, which has been appropriately edited.

As illustrated in FIG. 27, a capture device 12*a* is connected to an interface to cloud services 438, an edit module 442, and a director module 444. Cloud translation services are provided as denoted by reference numeral 440.

In the example of FIG. 27 the captured images are sent to cloud services for further editing, before being returned to the capture device, and then the capture device providing a video stream which is appropriately adapted.

These arrangements may allow the video stream provided by the capture device to be augmented to include, for example, subtitles in different languages. The capture device may provide multiple video streams which have been augmented in different ways, in combination with the raw video stream.

With reference to FIGS. 28 to 31 there is further illustrated examples with reference to grouping.

Figure 28:
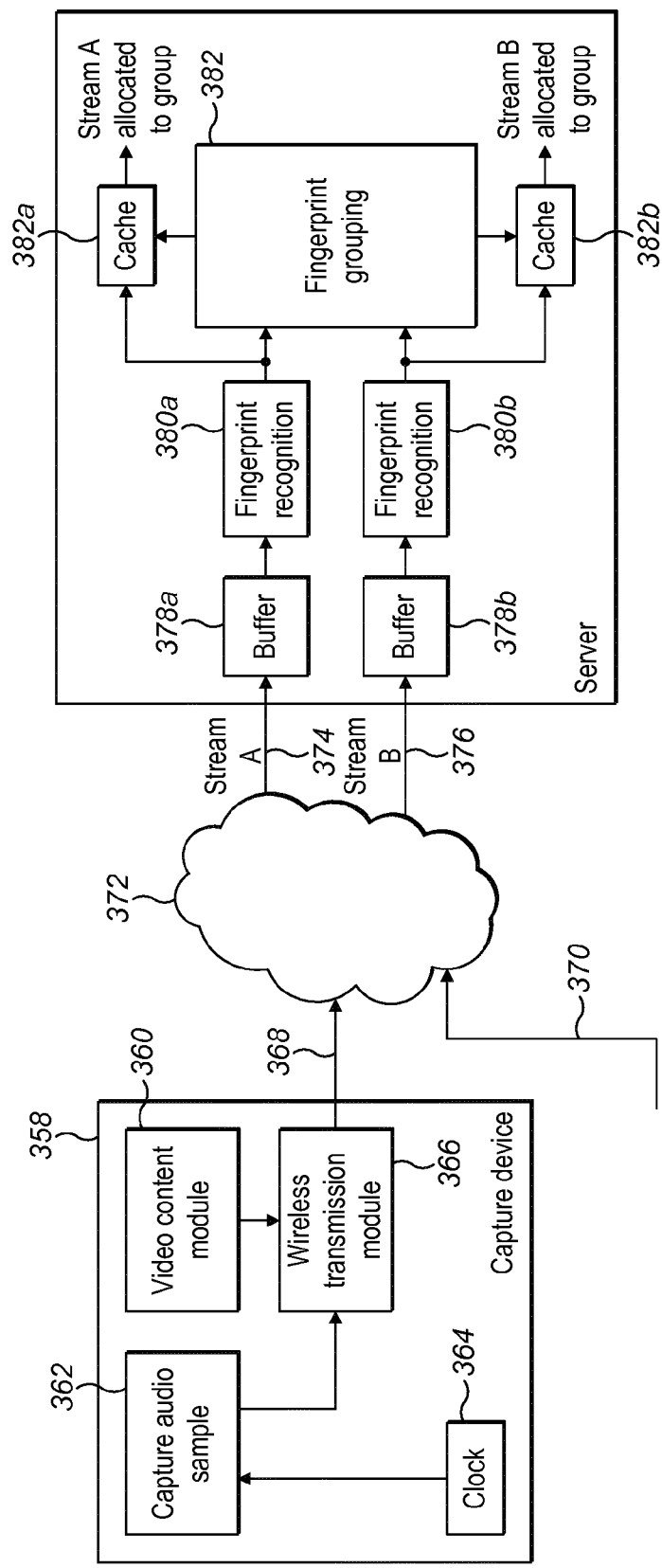
FIGS. 28 to 31 illustrate the exemplary grouping of streams.

With respect to FIG. 28, there is illustrated an arrangement in which incoming video streams are grouped at a video streaming server in accordance with the recognition of fingerprints contained within the video streams.

A capture device 358 includes a capture audio sample module 362, a video content module 360, a wireless transmission module 366, and a clock 364.

A server contains first and second buffers 378a and 378b, first and second fingerprint recognition modules 380a and 380b, first and second caches 382a and 382b, and a fingerprint grouping module 382.

The capture device and the server are connected via a network 372, the network receiving a stream on line 368 from the capture deice 358, and generating a stream A and a steam B on lines 374 and 376 to the server. The network also receives further streams as represented by line 370.

Figure 29:
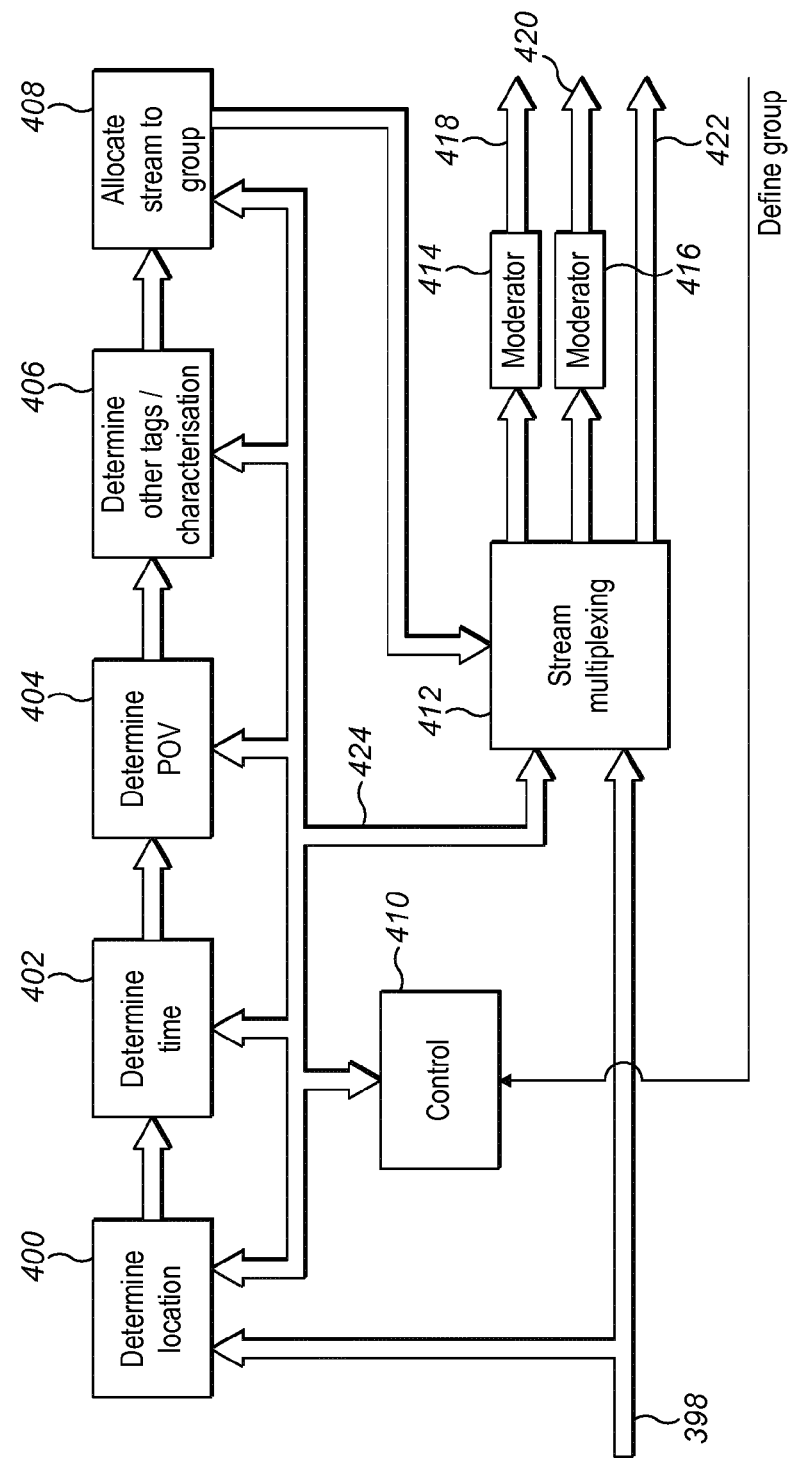

With reference to FIG. 29 there is illustrated an arrangement in which various modules are utilised in order to group incoming video streams. In FIG. 29 a server is configured to include a determine location module 400, a determine time module 402, a determine POV module 404, a determine other tags/characteristics module 406, an allocate stream to group module 408, a stream multiplexing module 412, and moderator modules 414 and 416.

With an arrangement such as FIG. 29, incoming video streams may be grouped, for example, in dependence upon the time of the content of the video stream, the location of the capture device associated with the video stream, the point of view of the capture device of the video stream, or other tags/characteristics of the video stream associated with the device, or other metadata associated with a video stream.

A grouped video stream may be provided for viewing, or may be provided to a moderator or other element for further processing.

The video streaming server may receive a control signal in order to define a group, and the control signal may be received from a viewing device or from an event organiser.

Figure 30:
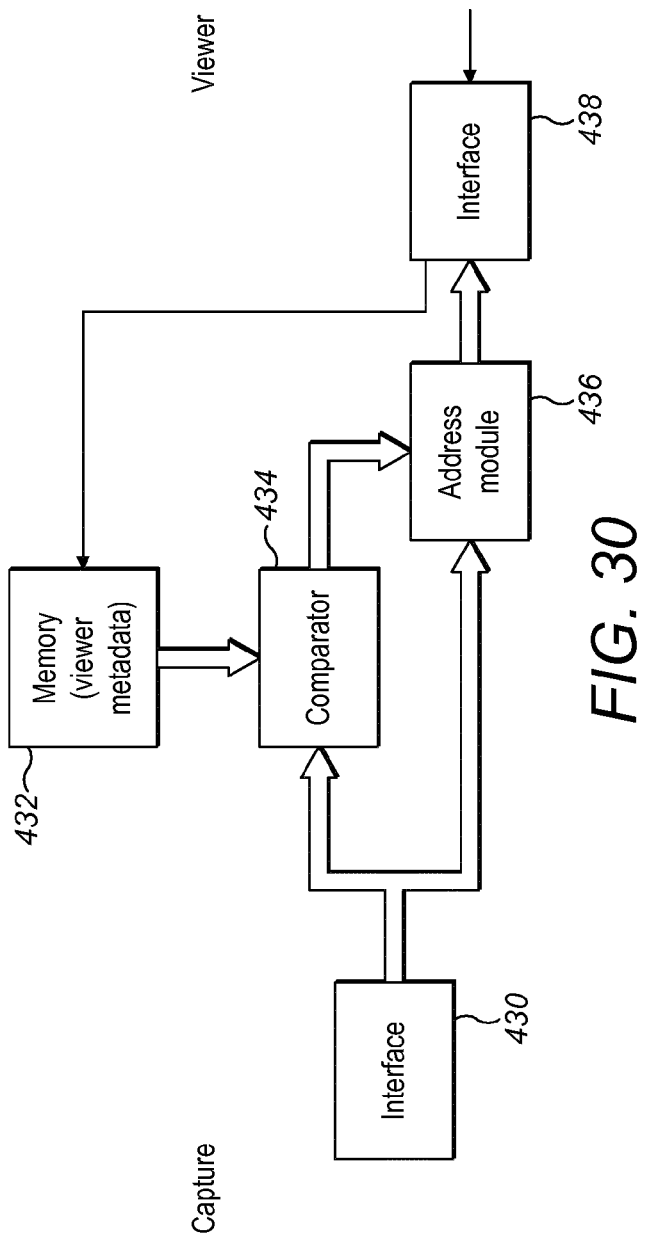

Reference is now made to FIG. 30, in which there is illustrated an interface 430, a memory 432, a comparator 434, an address module 436, and an interface 438.

FIG. 30 illustrates an example in which a viewing device provides the content server with metadata which is stored in a memory of the content server, which metadata illustrates tags or characteristics which the viewing device is interested in receiving video streams for, if the video streams are associated with those tags or characteristics. A receive video stream is compared with the metadata stored in the memory, and if a match is identified then an address module attaches the appropriate address to the video stream, and provides it to an interface for delivery to the viewing device.

Figure 31:
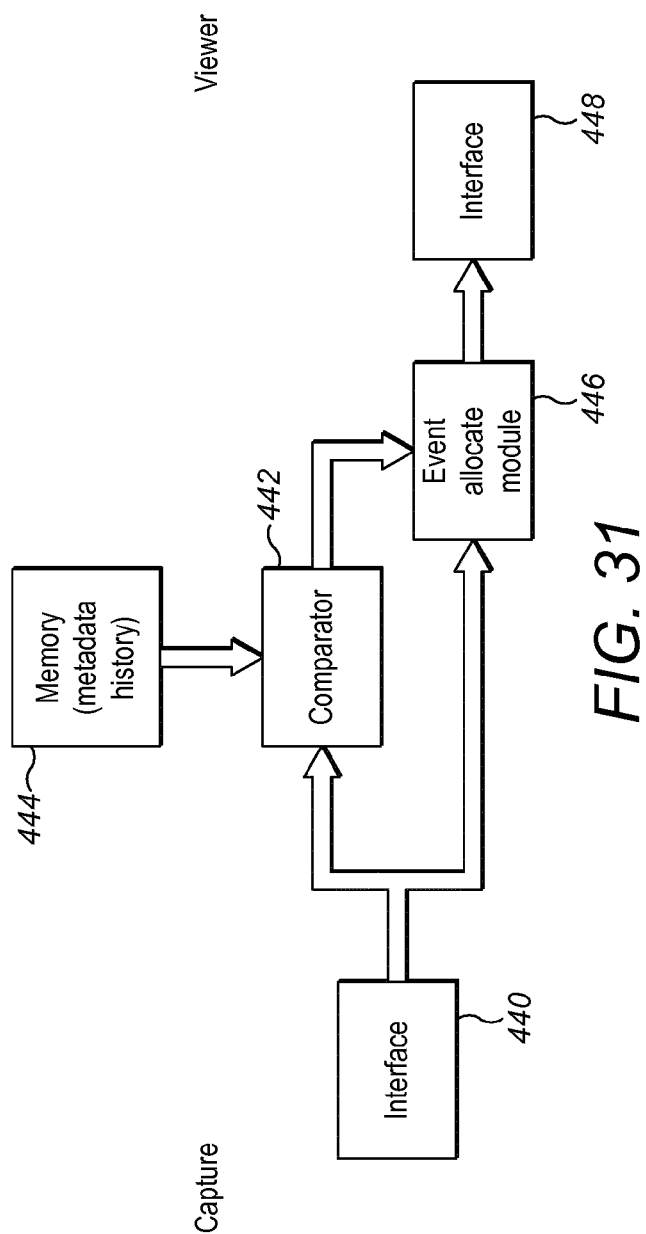

Reference is now made to FIG. 31, in which there is illustrated an interface 440, a memory 444, a comparator 442, an event allocate module 446, and an interface 448.

FIG. 31 illustrates a similar example, in which the metadata history associated with viewing devices is stored in a memory. Thus a viewing device may not have indicated to the content server that they particularly want to receive video streams at this instant. Nevertheless the content server may compare the metadata of the incoming video stream with metadata associated with historical requests from viewing devices, and accordingly allocate the video stream to a viewing device, or to an event, in dependence on the comparison.

Figure 32:
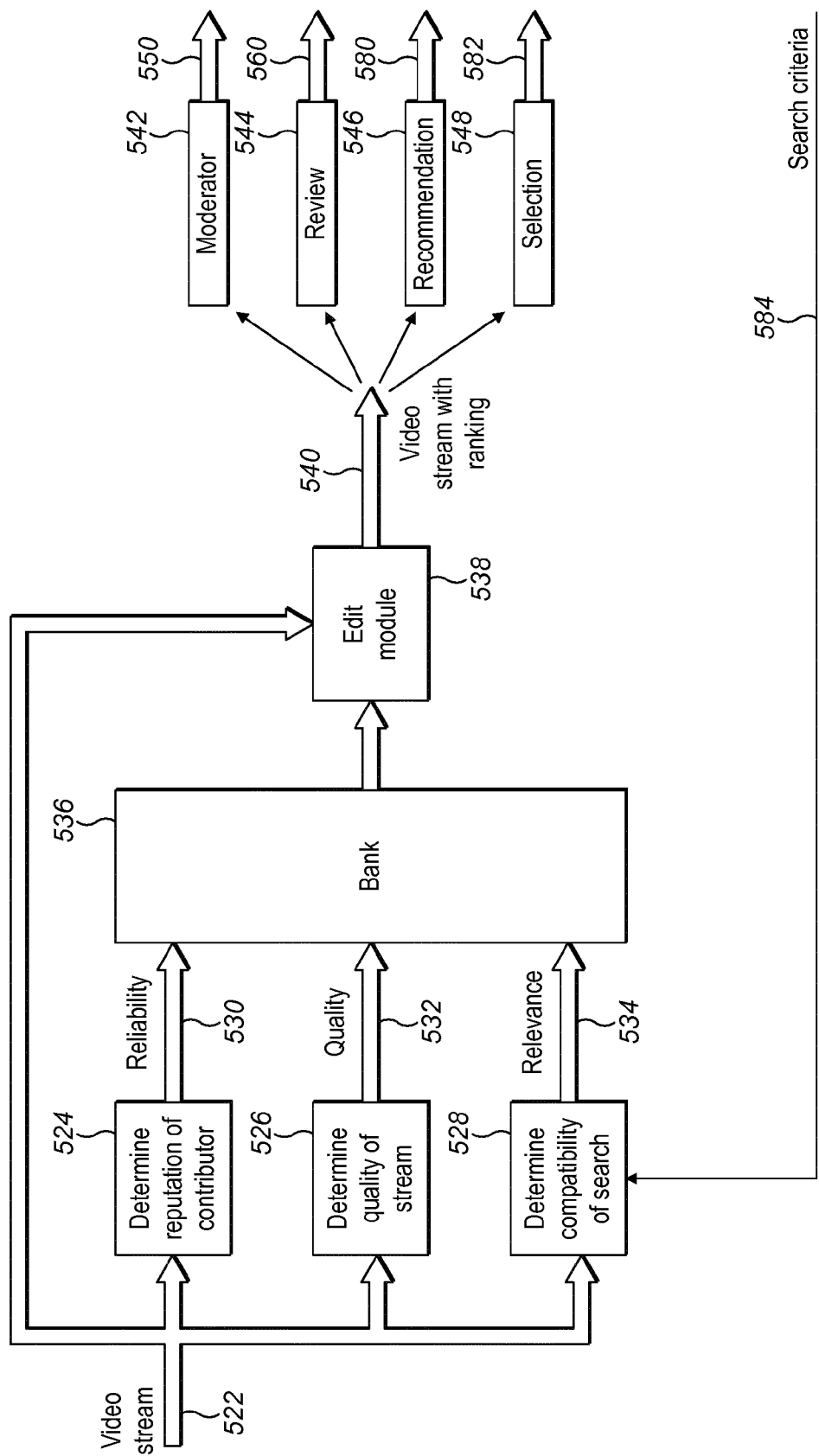
FIG. 32 illustrates the exemplary prioritisation of streams.

With reference to FIG. 32 there is further illustrated an examples with reference to priority.

With reference to FIG. 32, there is provided a module to determine a reputation of a contributor 524, a module to determine quality of a stream 526, a module to determine compatibility of a search 528, a rank module 536, an edit module 538, a moderator module 542, a review module 544, a recommendation module 546, and a selection module 548.

As illustrated in FIG. 32, an incoming video stream 522 may be processed by a streaming server in order to rank the video stream, and then allocated to one of various modules to provide streams 550, 560, 580, 582.

The ranking may be based upon the reputation of a contributor associated with a capture device, the determined quality of the video stream, or the determined compatibility of the video stream to search parameters provided by a search criteria. The incoming video streams are ranked, optionally edited, before being sent out to a viewing device, optionally via a moderator, a review process, a recommendation process or a selection process.

In this description, when reference is made to content, this includes any items or data and not just video content.

All the examples and embodiments described herein may be implemented as processed in software. When implemented as processes in software, the processes (or methods) may be provided as executable code which, when run on a device having computer capability, implements a process or method as described. The execute code may be stored on a computer device, or may be stored on a memory and may be connected to or downloaded to a computer device.

Examples and embodiments are described herein, and any part of any example or embodiment may be combined with any part of any other example or embodiment. Parts of example are embodiments are not limited to being implemented in combination with a part of any other example or embodiment described. Features described are not limited to being only in the combination as presented.

The invention claimed is:

1. A system for providing streaming services, comprising:
(i) a plurality of capture devices, each configured to:
   capture audio and/or video;
   generate a captured data stream including a content based on the captured audio and/or video;
   transmit the captured data stream;
(ii) a server configured to:
   receive a plurality of captured data streams transmitted from the plurality of capture devices;
   allocate a priority to each of the plurality of received captured data streams, wherein allocating the priority is dynamic, the priority allocated to each of the plurality of received captured data streams being dependent on the content to be processed at any moment in the data stream, such that each of the plurality of received captured data streams has a timeline of priority associated with each piece of content in a duration of the respective data stream;
   queue each of the plurality of received captured data streams with the respective timeline for processing;
   process the content of each of the plurality of received captured data streams in dependence on the priority allocated to the content in the duration in each moment to generate a viewing stream, by:
     at each moment, allocating to the viewing stream the content of one of the received captured data streams having the highest priority at that moment, wherein at each moment the content of one of the received captured data streams is present on the viewing stream, and
(iii) a plurality of viewing devices each configured to:
   submit a content request to the server; and
   receive the viewing stream responsive to the content request.

2. The system of claim 1 wherein the server is further configured to dynamically prioritise the content in each of the plurality of captured data streams in dependence on a definition for prioritization at each moment.

3. The system of claim 1 wherein the server is further configured to dynamically prioritise the content in each of the plurality of captured data streams in dependence on metadata of the captured data stream at each moment.

4. The system of claim 1 wherein the plurality of captured data streams are grouped, and then within each group, each of the plurality of captured data streams is prioritised in dependence on metadata associated with the content in each of the plurality of captured data streams at each moment.

5. The system of claim 1 wherein the priority of a captured data stream is used to determine the output of that captured data stream from the server.

6. The system of claim 3 wherein the metadata for the captured data stream additionally includes a dynamic prioritisation score.

7. The system of claim 6 wherein the prioritisation score is based on a reputation of a user associated with a capture device.

8. The system of claim 6 wherein the metadata for the captured data stream additionally includes feedback data from a device receiving the output stream from the server.

9. The system of claim 8, the device having made a request for content from the server, the prioritisation score being indicative of a relevance of the captured data stream to the request.

10. The system of claim 8 wherein the feedback data is used to adjust the prioritisation score of the captured data stream.

11. The system of claim 8 wherein the prioritisation score is a viewer rating.

12. The system of claim 3 wherein the metadata for the captured data stream additionally includes feedforward data based on a capture device from which the captured data stream is provided.

13. The system of claim 12 wherein the feedforward data is used to adjust the prioritisation score of the captured data stream.

14. The system of claim 13 wherein the prioritisation score is a capture device rating.

15. The system of claim 1 wherein each of the plurality of the captured data streams is edited in dependence on its priority.

16. The system of claim 15 wherein the server edits the plurality of captured data streams based on a set of rules.

17. The system of claim 16 wherein the set of rules apply to a group.

18. The system of claim 16 wherein the set of rules is used to allocate a captured data stream to a group in dependence on metadata of the data stream.

19. A method for providing streaming services, comprising:

capturing audio and/or video at each of a plurality of capture devices;

generating a captured data stream at each of the plurality of capture devices;

transmitting the captured data stream including a content based on the captured audio and/or video from each of the plurality of capture devices;

receiving, at a server, a plurality of captured data streams transmitted from the plurality of capture devices;

allocating, at the server, a priority to each of the plurality of received captured data stream, wherein allocating the priority is dynamic, the priority allocated to each of the plurality of received captured data streams being dependent on the content to be processed at any moment, such that each of the plurality of received captured data streams has a timeline of priority associated with each piece of content in a duration of the data stream;

queuing, at the server, each of the plurality of received captured data streams with the respective allocated priority timeline for processing;

processing, at the server, each of the plurality of queued received captured data streams in dependence on the priority allocated to the content in the duration in each moment to generate a viewing stream, by:

at each moment, allocating to the viewing stream the content of one of the captured data streams having the highest priority at that moment, wherein at each moment the content of one of the received captured data streams is present on the viewing stream;

submitting a content request from a viewing device to the server; and receiving the viewing stream at the viewing device responsive to the content request.

20. A server for providing streaming services, configured to:

receive a plurality of captured data streams from a plurality of capture devices;

allocate a priority to each received captured data stream, wherein allocating the priority is dynamic, the priority allocated to each received captured data stream being dependent on the content to be processed at any moment, such that each received captured data stream has a timeline of priority associated with each piece of content in a duration of the data stream;

queue each received captured data stream for processing;

process the content of each received captured data stream in dependence on the priority allocated to the content in the duration in each moment by, at each moment, allocating to a viewing stream the content of one of the captured data streams having the highest priority at that moment, wherein at each moment the content of one of the received captured data streams is presented on the viewing stream; and output the viewing stream.

* * * * *